United States Patent
Prasad et al.

(10) Patent No.: US 11,310,169 B2
(45) Date of Patent: *Apr. 19, 2022

(54) NETWORK-ON-CHIP TOPOLOGY GENERATION

(71) Applicant: Arm Limited, Cambridge (GB)

(72) Inventors: Honnahuggi Harinath Venkata Naga Ambica Prasad, Bangalore (IN); Nitin Kumar Agarwal, Bangalore (IN); Anup Gangwar, Austin, TX (US); Narayana Sri Harsha Gade, Bangalore (IN); Ravishankar Sreedharan, Bangalore (IN)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/152,034

(22) Filed: Jan. 19, 2021

(65) Prior Publication Data

US 2021/0160194 A1 May 27, 2021

Related U.S. Application Data

(63) Continuation-in-part of application No. 17/076,403, filed on Oct. 21, 2020, now Pat. No. 11,194,950, (Continued)

(51) Int. Cl.
*H04L 49/00* (2022.01)
*H04L 49/109* (2022.01)
(Continued)

(52) U.S. Cl.
CPC ........ *H04L 49/109* (2013.01); *H04L 43/0852* (2013.01); *H04L 43/0894* (2013.01);
(Continued)

(58) Field of Classification Search
CPC ... H04L 49/109; H04L 47/2441; H04L 47/24; H04L 43/0852; H04L 43/0894;
(Continued)

(56) References Cited

U.S. PATENT DOCUMENTS 8,819,616 B2 * 8/2014 Philip ..................... G06F 13/40
716/138
9,444,702 B1 * 9/2016 Raponi ................. H04L 43/045
(Continued)

*Primary Examiner* — Naum Levin
(74) *Attorney, Agent, or Firm* — Leveque Intellectual Property Law, PC

(57) ABSTRACT

The present disclosure provides a computer-based method and system for synthesizing a NoC. Traffic data is determined or received, and a baseline topology is generated or received. For each router in the baseline topology, a number of edge virtual channel (EVC) combinations is determined, the transmittablility of the traffic classes are determined, and, when the traffic classes are not transmittable, the router is identified. A traffic class affinity graph (TCAG) is generated for each identified router. Traffic class combinations are generated for the identified routers based on the TCAGs and EVC combinations. The traffic classes of the identified routers are merged based on the traffic class combinations. A final EVC combination for each identified router is determined based on the merged traffic classes. A final topology is generated based, at least in part, on the merged traffic classes and the final EVC combinations for the identified routers.

20 Claims, 23 Drawing Sheets

Related U.S. Application Data which is a continuation-in-part of application No. 16/518,254, filed on Jul. 22, 2019, now Pat. No. 10,817,627.

(51) Int. Cl.
  *H04L 47/2441* (2022.01)
  *H04L 43/0852* (2022.01)
  *H04L 45/12* (2022.01)
  *H04L 45/02* (2022.01)
  *H04L 45/586* (2022.01)
  *H04L 43/0894* (2022.01)

(52) U.S. Cl.
  CPC .............. *H04L 45/02* (2013.01); *H04L 45/12* (2013.01); *H04L 45/586* (2013.01); *H04L 47/2441* (2013.01)

(58) Field of Classification Search
  CPC ....... H04L 45/12; H04L 45/02; H04L 45/586; H04L 41/5022; H04L 41/0873; H04L 41/0806; H04L 41/12; G06F 15/7825
  See application file for complete search history.

(56) References Cited

U.S. PATENT DOCUMENTS

| | | | |
|---|---|---|---|
| 10,042,404 B2* | 8/2018 | Gangwar | G06F 1/3296 |
| 10,218,580 B2* | 2/2019 | Chopra | H04L 41/145 |
| 10,318,243 B2* | 6/2019 | Gangwar | H04L 49/40 |
| 10,484,267 B2* | 11/2019 | Gerstel | H04L 41/0668 |
| 10,791,045 B2* | 9/2020 | Agarwal | H04L 45/02 |
| 10,817,627 B1* | 10/2020 | Agarwal | G06F 30/394 |
| 11,050,672 B2* | 6/2021 | Prasad | H04L 47/283 |
| 11,121,933 B2* | 9/2021 | Cherif | H04L 41/0803 |
| 2015/0109024 A1* | 4/2015 | Abdelfattah | G06F 30/34 326/41 |
| 2015/0178435 A1* | 6/2015 | Kumar | G06F 30/327 716/114 |
| 2018/0227180 A1* | 8/2018 | Rao | G06F 15/7825 |
| 2020/0267073 A1* | 8/2020 | Agarwal | H04L 45/02 |
| 2021/0036959 A1* | 2/2021 | Cheng | H04L 47/2433 |
| 2021/0036967 A1* | 2/2021 | Agarwal | G06F 15/7825 |
| 2021/0058289 A1* | 2/2021 | Gangwar | H04L 47/24 |
| 2021/0168038 A1* | 6/2021 | Gade | H04L 45/02 |

\* cited by examiner

Traffic Flows Over 1st Variation Topology
2 Routers (4-port, 2 VCs)

Traffic Flows Over 2nd Variation Topology
3 Routers (4-port, 2 VCs)

NETWORK-ON-CHIP TOPOLOGY GENERATION

CROSS-REFERENCE TO RELATED APPLICATIONS

This application is a continuation-in-part (CIP) of U.S. patent application Ser. No. 17/076,403 (filed on Oct. 21, 2020, now U.S. Pat. No. 11,194,950), which is a continuation-in-part (CIP) of U.S. patent application Ser. No. 16/518,254 (filed on Jul. 22, 2019, now U.S. Pat. No. 10,817,627), the disclosures of which are incorporated herein by reference in their entireties.

BACKGROUND

The present disclosure relates to a network. More particularly, the present disclosure relates to a Network-on-Chip (NoC).

A NoC is a network-based communication subsystem implemented on an integrated circuit (IC), such as a System-on-Chip (SoC), that enables IC modules to exchange data more effectively than conventional bus or crossbar architectures. More particularly, a NoC is a router-based packet switching network that connects IC modules, such as intellectual property (IP) cores. A NoC includes various components, such as routers, resizers or serializers/deserializers (SerDes's), physical clock domain crossing (PCDC) buffers, pipeline elements, etc. NoC synthesis is a process that lays out and configures NoC components on the IC based on a NoC input specification. Generally, the NoC design must accommodate the data or traffic communicated between IC modules while satisfying various design constraints, such as power, performance and area (PPA), wiring cost, etc., that may conflict with one another.

NoC synthesis includes, inter alia, generating the topology for the NoC, which is the arrangement of routers, connections, and traffic paths or routes between IC modules. A poorly-designed NoC topology can significantly impact the NoC's PPA, wiring cost, etc., and may create Head-of-Line (HoL) blocking across classes of traffic. HoL blocking occurs when a sequence of packets from one traffic class is blocked by a packet from another traffic class even though the route for the blocked traffic class is clear. HoL blocking across traffic classes reduce NoC performance.

Clock-frequency requirements, area constraints, placement and routing (P&R) restrictions, etc., pose additional system limitations on the NOC topology such as, for example, the available router ports, the number of virtual channels (VCs), the link-size, etc. Eliminating HoLs for NoC topologies with large numbers of traffic classes poses a challenge because the traffic classes processed by many routers may require a combination of router ports and VCs that exceeds the number of available ports and VCs on the router, resulting in an inevitable conflict.

DETAILED DESCRIPTION

Figure 1:
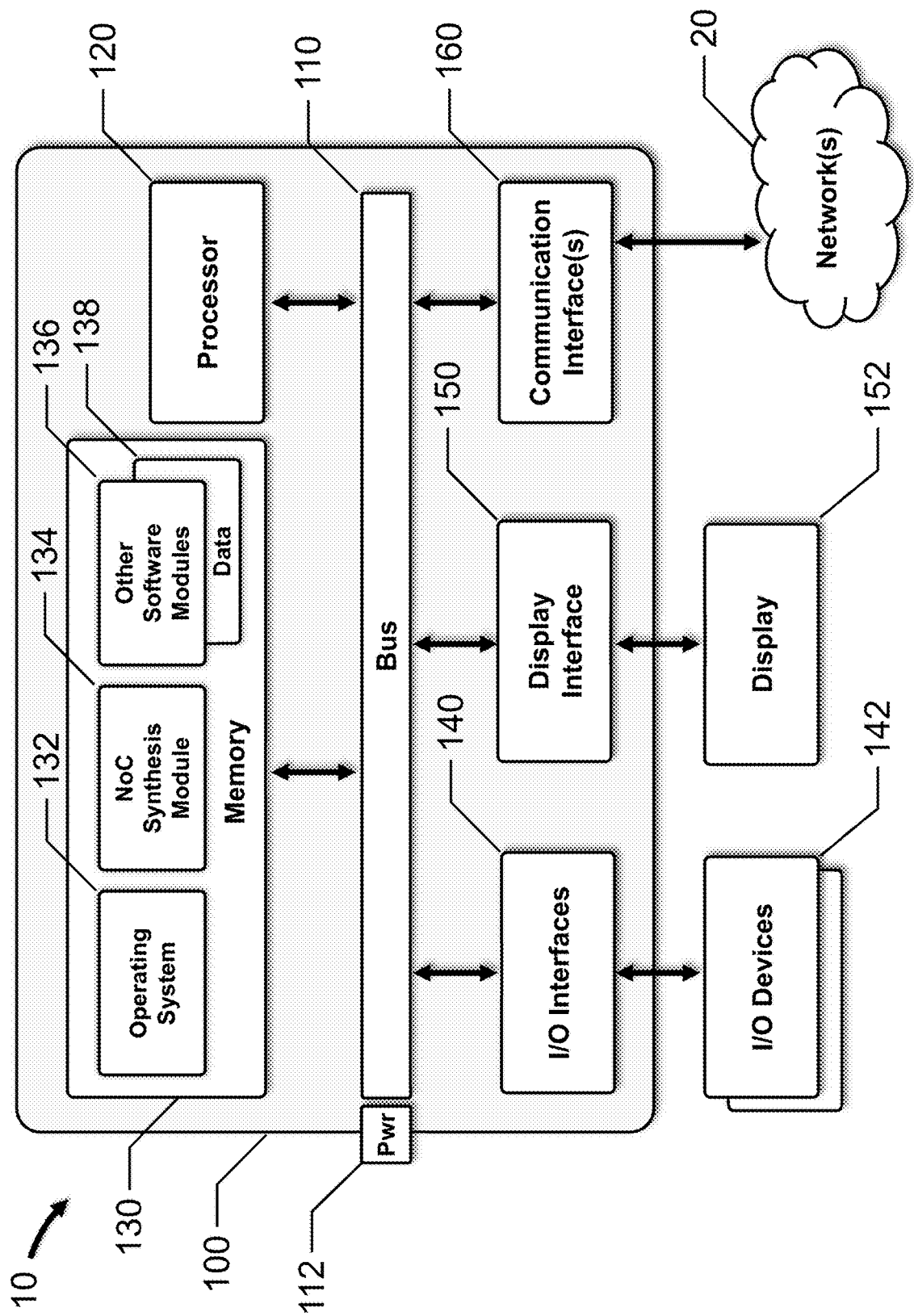
FIG. 1 depicts a block diagram of a NoC synthesis system, in accordance with an embodiment of the present disclosure.

Embodiments of the present disclosure will now be described with reference to the drawing figures, in which like reference numerals refer to like parts throughout.

Embodiments of the present disclosure advantageously provide a computer-based method and system for synthesizing a Network-on-Chip (NoC). More particularly, embodiments of the present disclosure advantageously generate NoCs with minimal loss of performance in designs with large numbers of traffic classes and port-limited routers.

In one embodiment, a method for synthesizing a Network-on-Chip (NoC), is provided. Traffic data and a baseline topology are received, the traffic data including a plurality of traffic flows, each traffic flow including one or more traffic classes, the baseline topology including a plurality of bridge ports, a plurality of routers and a plurality of connections, each router including a number of ports, each router configured to process a plurality of traffic classes and to support a maximum number of virtual channels (VCs). For each router, a number of edge virtual channel (EVC) combinations is determined, each EVC combination including a number of available edges and a number of available VCs, each available edge corresponding to a different port; whether the traffic classes are transmittable or receivable by at least one EVC combination is determined; and, when the traffic classes are determined not transmittable or receivable, the router is identified. A traffic class affinity graph (TCAG) is generated for each identified router. Traffic class combinations for the identified routers are generated based on the TCAGs and the EVC combinations. Traffic classes of the identified routers are merged based on the traffic class combinations. A final EVC combination for each identified router is determined based on the merged traffic classes. A final topology is generated based, at least in part, on the merged traffic classes and the final EVC combinations for the identified routers.

FIG. 1 depicts a block diagram of NoC synthesis system 10, in accordance with an embodiment of the present disclosure.

Computer 100 includes bus 110, processor 120, storage element or memory 130, I/O interfaces 140, display interface 150, and one or more communication interfaces 160. Generally, I/O interfaces 140 are coupled to I/O devices 142 using a wired or wireless connection, display interface 150 is coupled to display 152, and communication interface 160 is connected to network 20 using a wired or wireless connection.

Bus 110 is a communication system that transfers data between processor 120, memory 130, I/O interfaces 140, display interface 150, and communication interface 160, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 100. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, NoC synthesis module 134, other software modules 136, etc., stored within memory 130.

Generally, memory 130 stores instructions for execution by processor 120 and data. Memory 130 may include a variety of non-transitory computer-readable medium that may be accessed by processor 120. In various embodiments, memory 130 may include volatile and nonvolatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 100. The software modules also include NoC synthesis module 134 that provides functionality for synthesizing the NoC architecture. In certain embodiments, NoC synthesis module 134 may include a plurality of modules, each module providing specific individual functionality for synthesizing the NoC architecture, such as, for example, an input module, a VC module, a topology module, a routing module, a network generation module, a PCDC module, a link size and resizer module, a pipeline and timing component module, an output module, etc. Other software modules 136 may cooperate with NoC synthesis module 134 to provide functionality for synthesizing the NoC architecture.

Data 138 may include data associated with operating system 132, NoC synthesis module 134, other software modules 136, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 100 and/or output from computer 100. As discussed above, I/O devices 142 are operably connected to computer 100 using a wired and/or wireless connection. I/O devices 142 may include a local processor coupled to a communication interface that is configured to communicate with computer 100 using the wired and/or wireless connection. For example, I/O devices 142 may include a keyboard, mouse, touch pad, joystick, etc.

Display interface 150 is configured to transmit image data from computer 100 to monitor or display 152.

Communication interface 160 is configured to transmit data to and from network 20 using one or more wired and/or wireless connections. Network 20 may include one or more local area networks, wide area networks, the Internet, etc., which may execute various network protocols, such as, for example, wired and/or wireless Ethernet, Bluetooth, etc. Network 20 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Figure 2:
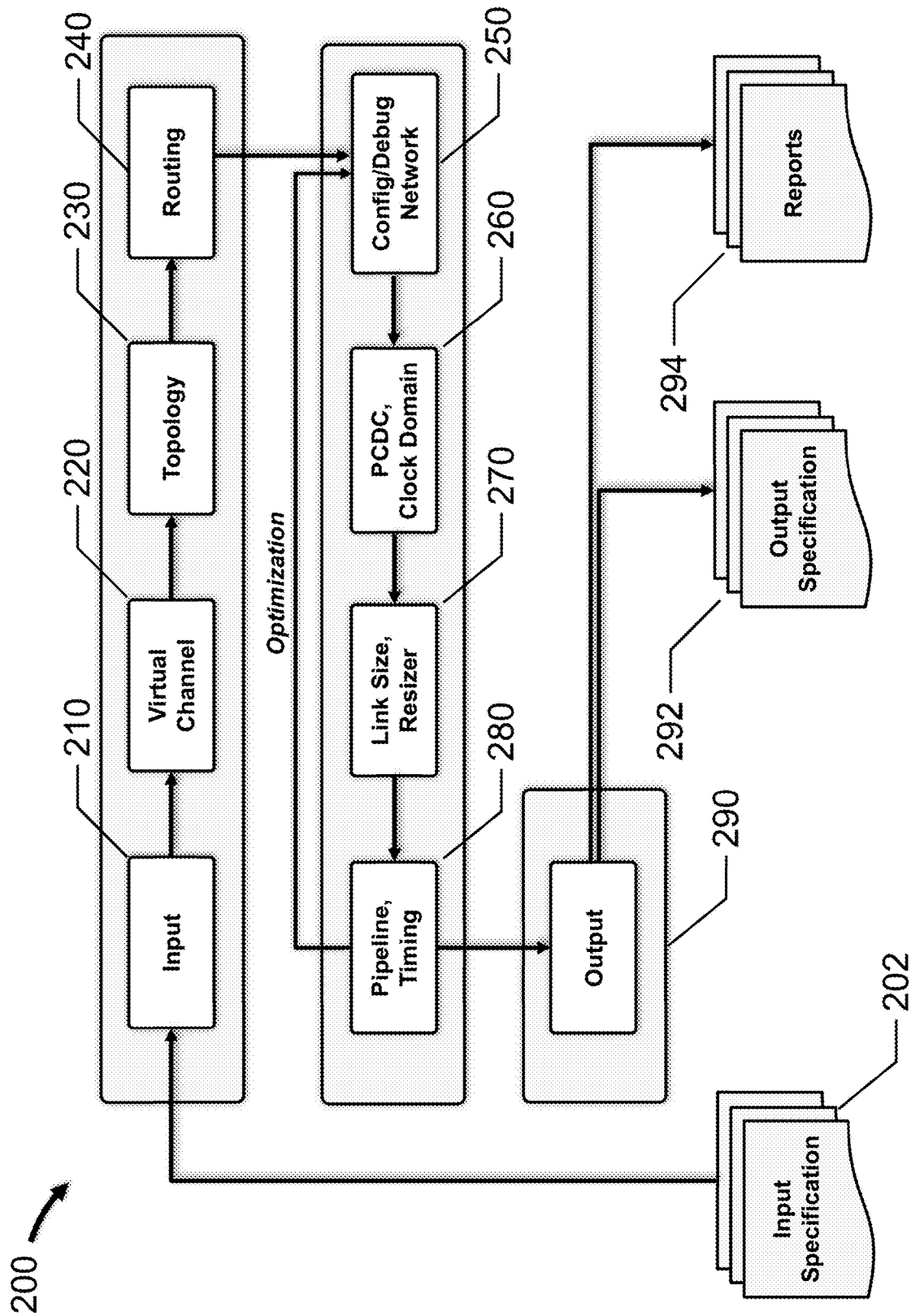
FIG. 2 depicts a NoC synthesis flow diagram, in accordance with an embodiment of the present disclosure.

FIG. 2 depicts NoC synthesis flow diagram 200, in accordance with an embodiment of the present disclosure.

As discussed above, the software modules include NoC synthesis module 134 that provides functionality for synthesizing the NoC architecture. In certain embodiments, NoC synthesis module 134 includes a plurality of modules, each module providing specific individual functionality for synthesizing the NoC architecture, such as, for example, an input module, a VC module, a topology module, a routing module, a network generation module, a PCDC module, a link size and resizer module, a pipeline and timing component module, an output module, etc.

At 210, NoC input specification 202 is retrieved from memory 130 and design information for the NoC is determined. For example, NoC input specification 202 may be received over network 20 and then stored as data 138 in memory 130. In another example, NoC input specification 202 may be created by a NoC designer using one or more software modules 136, and then stored as data 138 in memory 130.

Design information for the NoC includes, for example, physical data, device data, bridge data, traffic data, etc. Additional design information may include voltage domain data, power domain data, clock domain data, address region data, synthesis constraints, etc.

Physical data include the dimensions for the NoC and a list of unrouteable areas. NoC components, such as bridges, routers, pipelines, resizers, connections, etc., are not typically located within unrouteable areas. In one example, the NoC is modeled as an array of cells arranged in rows and columns. The number of rows is defined by a height (in cells), and the number of columns is defined by a width (in cells). A cell width, in millimeters, micrometers, inches, etc., may also be provided. The cells are numbered sequentially, starting in the upper left corner of the array. Data for each unrouteable area include a location (cell number) and dimensions, such as a width (in cells) and a height (in cells). In another example, the NoC is modeled as a grid defined by cartesian coordinates (X, Y), with the origin located in the lower left corner of the grid. The height and the width are provided in normalized units, and a normalization factor may also be provided. Data for each unrouteable area include a location (X,Y) and dimensions, such as a width (X) and a height (Y).

Device data include a list of devices, such as IP cores, IC modules, etc., located within the NoC. Each device includes one or more bridge ports (i.e., signal interfaces). Data for each device may include a name, a location (cell number, X-Y coordinates, etc.), dimensions including a width (in cells, X dimension, etc.) and a height (in cells, Y dimension, etc.), a power domain, etc.

Bridge data include a list of bridge ports for the devices. Data for each bridge port may include a name, an associated device name, a location (cell number, X-Y coordinates, etc.), a data width (in bits), a low/high wire indicator, etc.

In many embodiments, the NoC is a packet-switched network that divides data packets into a sequence of message flow control units or flits. Each flit has the same size (in bits), and is divided into a sequence of data transfers across a physical connection or link. A physical unit, or phit, is the number of bits that can be transferred in parallel in a single data transfer cycle across the physical connection, i.e., the bitwidth of the link. In one example, the flit size for the NoC is 128 bits. A bridge port having a data width (phit size) of 32 bits needs 4 data transfer cycles to transfer each flit. In the context of the present disclosure, the link size for this bridge port is 4 (each unit of link size is 32 bits). Similarly, a bridge port having a data width of 16 bits needs 8 data transfer cycles to transfer each flit and has a link size of 8 (each unit of link size is 16 bits), while a bridge port having a data width of 64 bits needs 2 data transfer cycles to transfer each flit and has a link size of 2 (each unit of link size is 64 bits). Other flit sizes, such as, for example, 32 bits, 64 bits, 256 bits, 512 bits, etc. may also be used. Different flow control techniques may be used in alternative embodiments.

Traffic data include a list of traffic flows for the NoC. Data for each traffic flow include a source bridge port, a destination bridge port, a peak traffic rate, an average traffic rate, and a traffic class. The source bridge port and the destination bridge port are included within the list of bridge ports. The peak traffic rate and the average traffic rate are provided in bits or bytes per second, such as, for example, b/s, kb/s, Mb/s, Gb/s, Tb/s, etc., B/s, KB/s, MB/s, GB/s, TB/s, etc. Generally, the traffic class provides one or more metrics that differentiate the level of NoC performance that may be provided for each traffic flow. In many embodiments, the traffic class includes a quality of service (QoS) metric and a latency sensitivity (LS) metric. The QoS metric provides a mechanism to prioritize traffic within the NoC, while the LS metric indicates the sensitivity of the traffic to network delays. For example, for an integer QOS metric with four possible values (e.g., 0 to 3) and a Boolean LS metric with two possible values (e.g., true or false), 8 different traffic classes are provided. In this example, a QoS value of 0 and an LS value of true provides the best potential NoC performance. Other metrics are also contemplated. Additionally, a message type may also be provided, such as, for example, a read request, a write request, a read/write request, etc.

Figure 4:
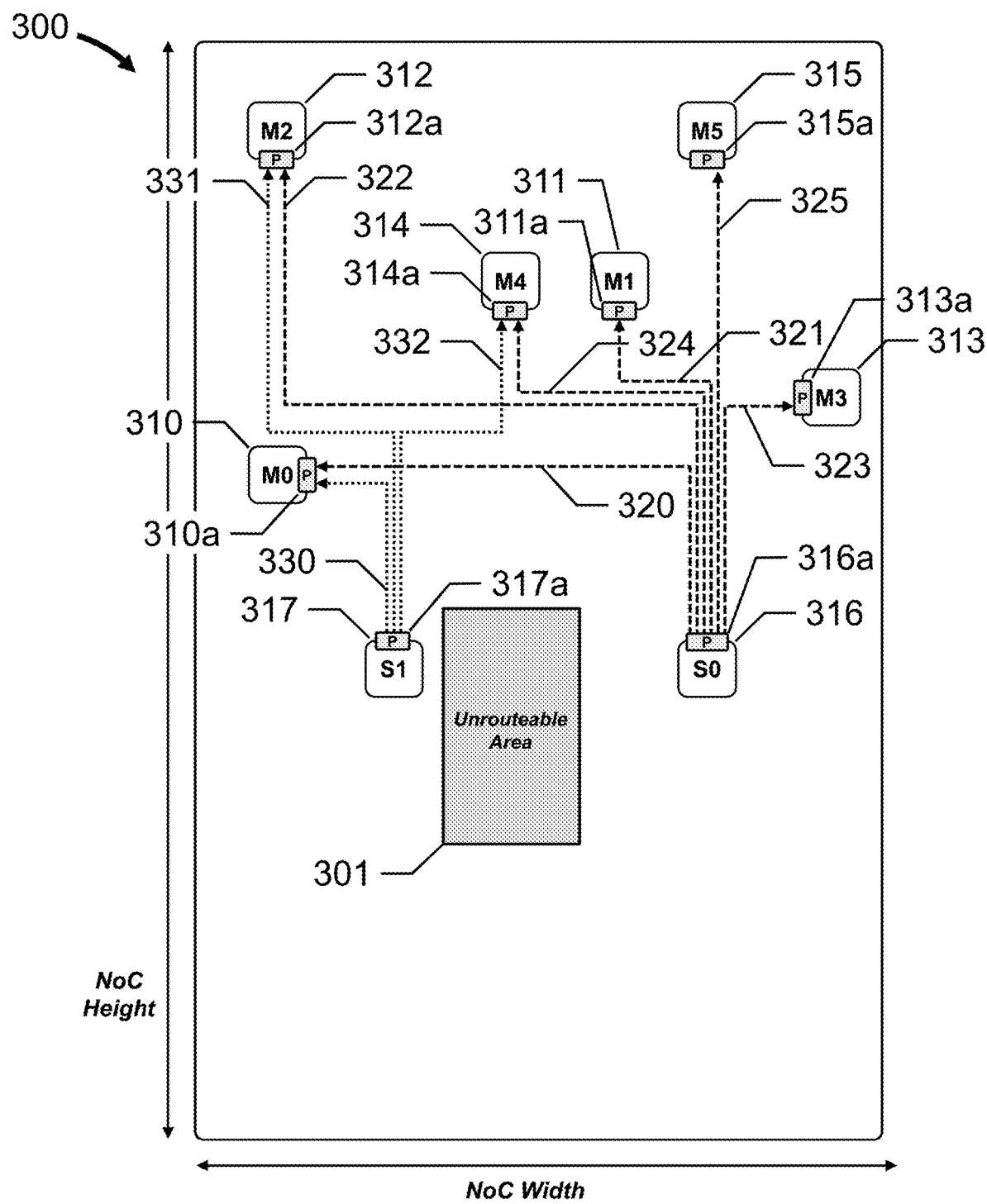
FIG. 4 depicts a graphical representation of an input specification for a NoC, in accordance with an embodiment of the present disclosure.

FIG. 4 depicts a graphical representation of NoC input specification 202, in accordance with an embodiment of the present disclosure. A user may view NoC 300 on display 152.

NoC 300 has a NoC height and a NoC width and includes unrouteable area 301 located within a central portion of NoC 300. Eight devices are dispersed throughout NoC 300, none of which are located within unrouteable area 301. Each device includes at least one bridge port ("P"). For ease of illustration, each device has a single bridge port. Device 310 includes bridge port 310a, device 311 includes bridge port 311a, device 312 includes bridge port 312a, device 313 includes bridge port 313a, device 314 includes bridge port 314a, device 315 includes bridge port 315a, device 316 includes bridge port 316a, and device 317 includes bridge port 317a. Generally, the location of each bridge port is limited by the location of the associated device and the footprint of the device within the NoC, i.e., the device width and height. For example, for an 8 cell×8 cell NoC, a device located at cell number 9 having a width of 1 cell and a height of 3 cells supports one or more bridge ports located at cell numbers 9, 17 and/or 25.

Nine sets of traffic flows between the devices are depicted; each traffic flow set includes at least one traffic flow. For example, a traffic flow set may include a traffic flow that defines a read request and a traffic flow that defines a write request. Traffic flow set 320 flows between bridge port 316a and bridge port 310a. Traffic flow set 321 flows between bridge port 316a and bridge port 311a. Traffic flow set 322 flows between bridge port 316a and bridge port 312a. Traffic flow set 323 flows between bridge port 316a and bridge port 313a. Traffic flow set 324 flows between bridge port 316a and bridge port 314a. Traffic flow set 325 flows between bridge port 316a and bridge port 315a. Traffic flow set 330 flows between bridge port 317a and bridge port 310a. Traffic flow set 331 flows between bridge port 317a and bridge port 312a. Traffic flow set 332 flows between bridge port 317a and bridge port 314a.

In many embodiments, devices 310, 311, 312, 313, 314 and 315 may be AXI master network interfaces (AMNIs), while devices 316 and 317 may be AXI slave network interfaces (ASNIs). Generally, AMNIs may send data to, as well as request data from, ASNIs. For ease of explanation, device 310 is labeled "M0," device 311 is labeled "M1," device 312 is labeled "M2," device 313 is labeled "M3," device 314 is labeled "M4," device 315 is labeled "M5," device 316 is labeled "S0," and device 317 is labeled "S1." Other configurations and types of devices may be accommodated.

Referring back to FIG. 2, at 220, a VC is assigned to each traffic flow. Generally, VCs are assigned to reduce conflicts and simplify the subsequent topology generation. In one embodiment, the VCs are assigned using an iterative estimation process that performs a specify-evaluate-refine loop until no significant improvement in the estimations are generated. Other assignment methodologies are also contemplated.

At 230, a topology for the NoC is determined.

Figure 3:
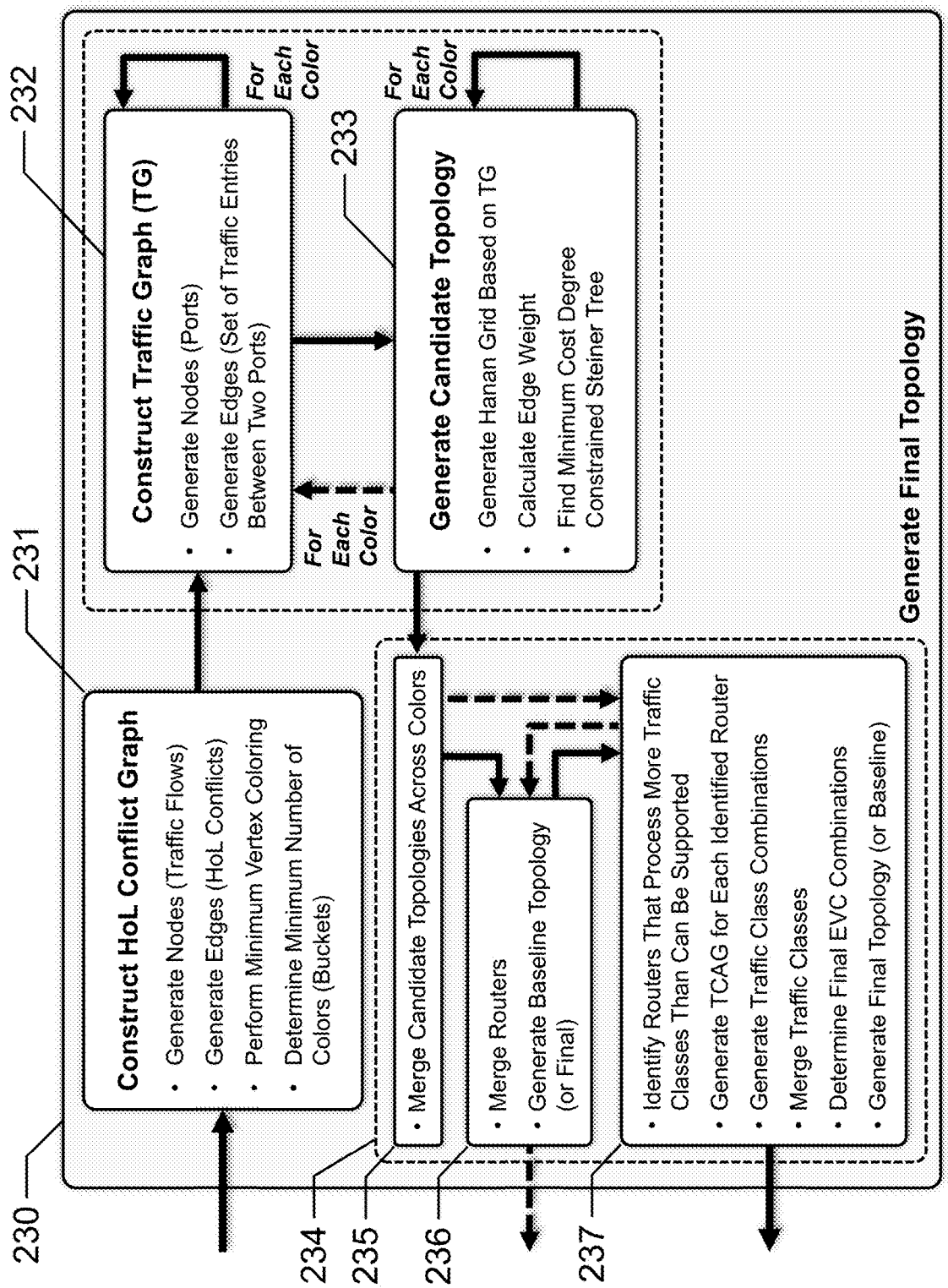
FIG. 3 depicts functionality associated with determining the topology for the NoC, in accordance with an embodiment of the present disclosure.

FIG. 3 depicts functionality associated with determining the topology for the NoC, in accordance with an embodiment of the present disclosure.

At 231, an HCG is constructed based on the traffic data and the VC assignments.

Figure 5:
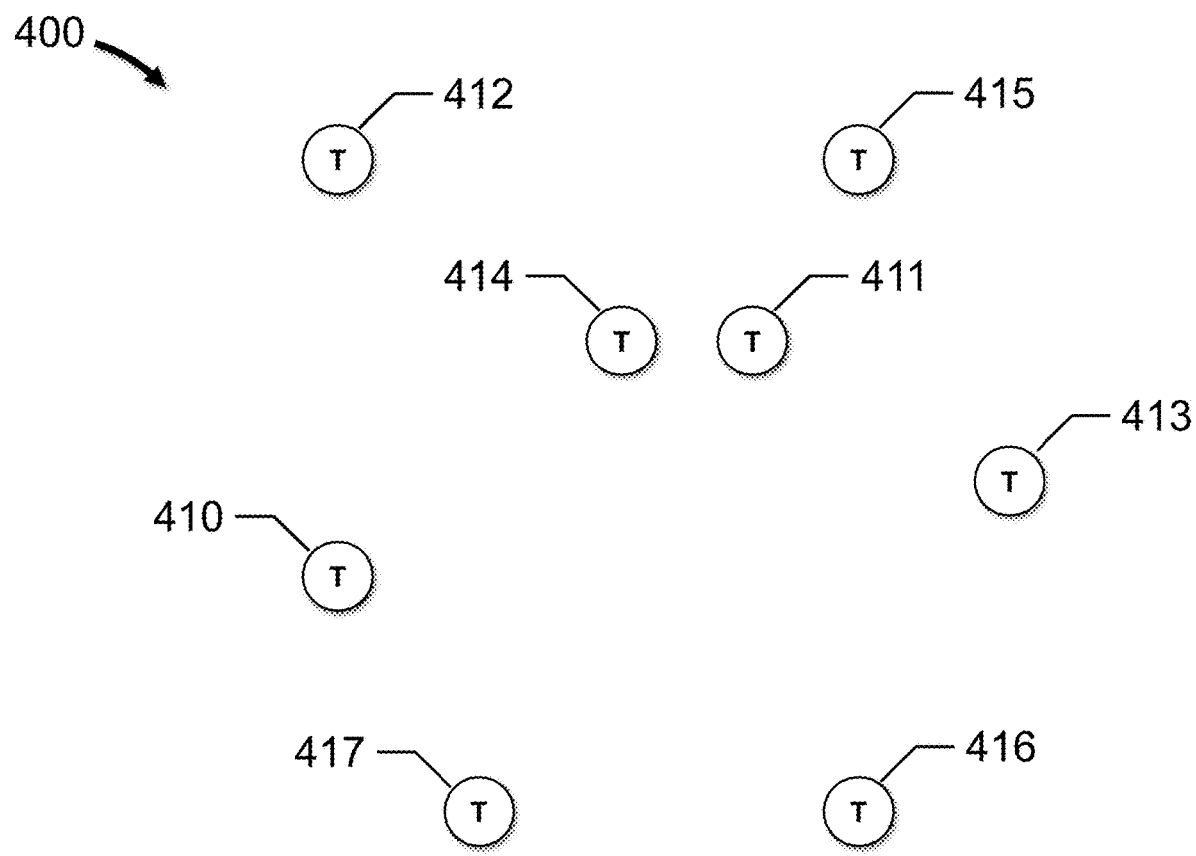
FIG. 5 depicts an HoL conflict graph (HCG) for a NoC, in accordance with an embodiment of the present disclosure.

FIG. 5 depicts HCG 400 for NoC 300, in accordance with an embodiment of the present disclosure. A user may view HCG 400 on display 152.

In this embodiment, HCG 400 includes traffic nodes 410 to 417 and no HoL edges. Each traffic node represents a traffic flow and each HoL edge represents an HoL conflict. An HoL conflict is defined as two traffic flows that are assigned to the same VC but have different traffic classes, such as, for example, different QoS values and/or different LS values. For the purpose of illustration only, each traffic flow set 320, 321, 322, 323, 324, 325, 330, 331 and 332 has a single traffic flow, which results in eight traffic nodes 410 to 417. A color is then assigned to each traffic node 410 to 417 to minimize HoL conflicts, with adjacent traffic nodes receiving different colors. In certain embodiments, minimum vertex coloring is used to find the minimum number of colors to assign to traffic nodes 410 to 417. Because there are no HoL conflicts, HCG 400 includes eight traffic nodes 410 to 417 in one color (white).

Referring back to FIG. 3, at 232, a TG for each color is constructed based on the physical data, the bridge data, the traffic data, and the modified HCG. In other words, a plurality of traffic graphs are constructed based on the physical data, the bridge data, the traffic data and the modified HCG.

Figure 6A:
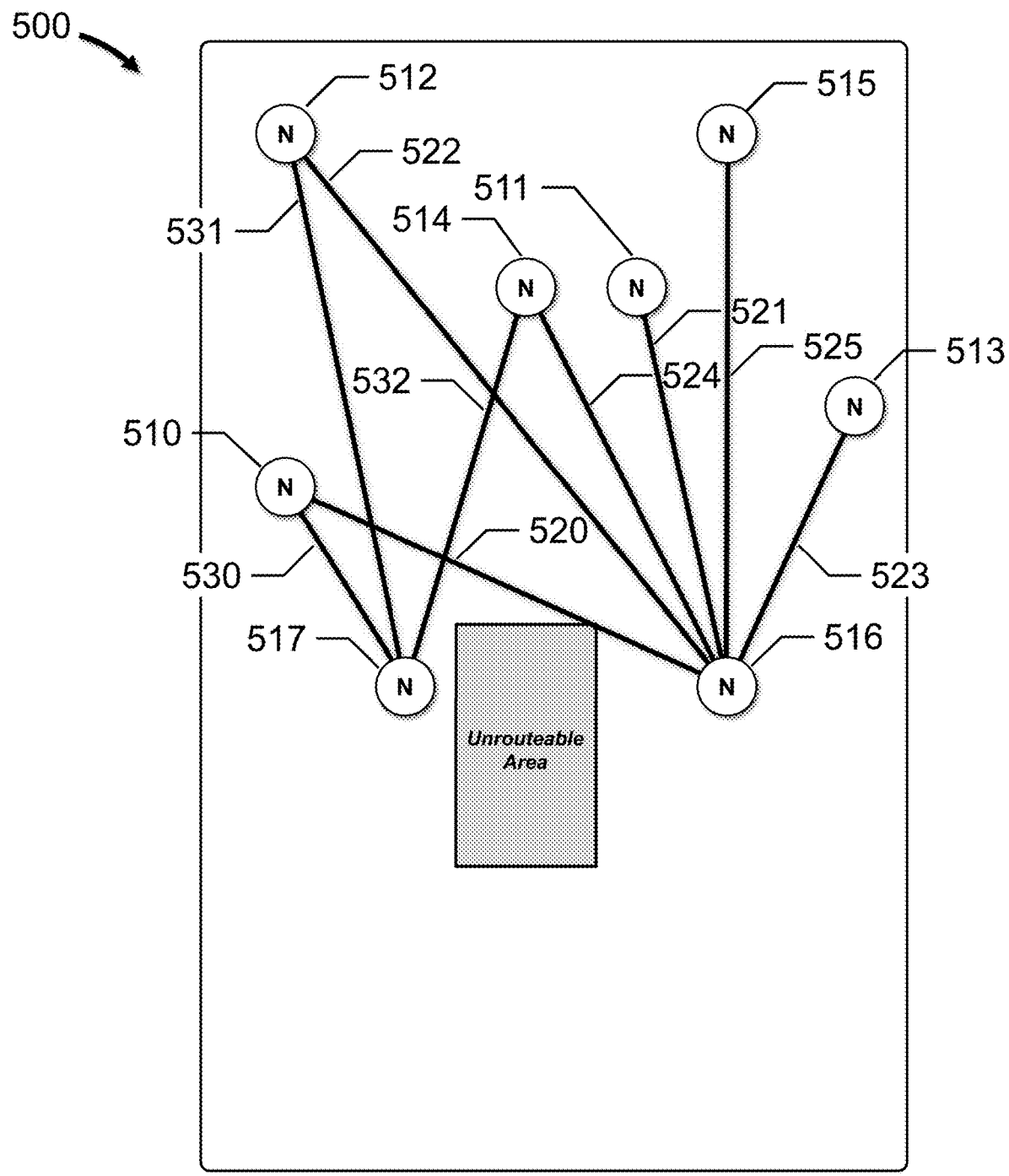
FIG. 6A depicts a traffic graph (TG) for a NoC, in accordance with an embodiment of the present disclosure.

FIG. 6A depicts TG 500 for NoC 300, in accordance with an embodiment of the present disclosure. TG 500 includes the color from HCG 400, i.e., white. A user may view TG 500 on display 152.

TG 500 includes nodes 510 to 517 and edges 520, 521, 522, 523, 524, 525, 530, 531 and 532. Each node 510 to 517 is associated with a different bridge port, and each edge 520, 521, 522, 523, 524, 525, 530, 531 and 532 connects pairs of nodes and is associated with a set of traffic flows between two bridge ports. As discussed above, each set of traffic flows includes at least one traffic flow.

More particularly, node 510 is associated with bridge port 310a, node 511 is associated with bridge port 311a, node 512 is associated with bridge port 312a, node 513 is associated with bridge port 313a, node 514 is associated with bridge port 314a, node 515 is associated with bridge port 315a, node 516 is associated with bridge port 316a, and node 517 is associated with bridge port 317a. Similarly, edge 520 is associated with traffic flow set 320, edge 521 is associated with traffic flow set 321, edge 522 is associated with traffic flow set 322, edge 523 is associated with traffic flow set 323, edge 524 is associated with traffic flow set 324, edge 525 is associated with traffic flow set 325, edge 530 is associated with traffic flow set 330, edge 531 is associated with traffic flow set 331, and edge 532 is associated with traffic flow set 332.

At 233, the candidate topology for each color is generated based on the respective TG. In other words, a candidate topology is generated for each TG. The candidate topology includes bridge ports, routers and connections.

FIGS. 6B to 6F depict a series of grids and topologies for TG 550, according to embodiments of the present disclosure. A user may view these grids and topologies on display 152.

First, a grid is generated based on the TG. The grid includes nodes and intersections that are formed by grid lines passing through each node. Each node is associated with a different bridge port and is located at a different intersection. In one embodiment, the grid is a Hanan grid formed by orthogonal vertical and horizontal grid lines. Other types of grids may also be generated, such as, for example, a lattice, a square or unit distance grid, etc.

Generally, the functionality at 232 and 233 is performed for each color. In one embodiment, the functionality at 232 is performed for all of the colors, and then the functionality at 233 is performed for all of the colors. In another embodiment, the functionality at 232 is performed for the first color, and then the functionality at 233 is performed for the first color. Next, the functionality at 232 is performed for the second color, and then the functionality at 233 is performed for the second color, and so on.

Figure 6B:
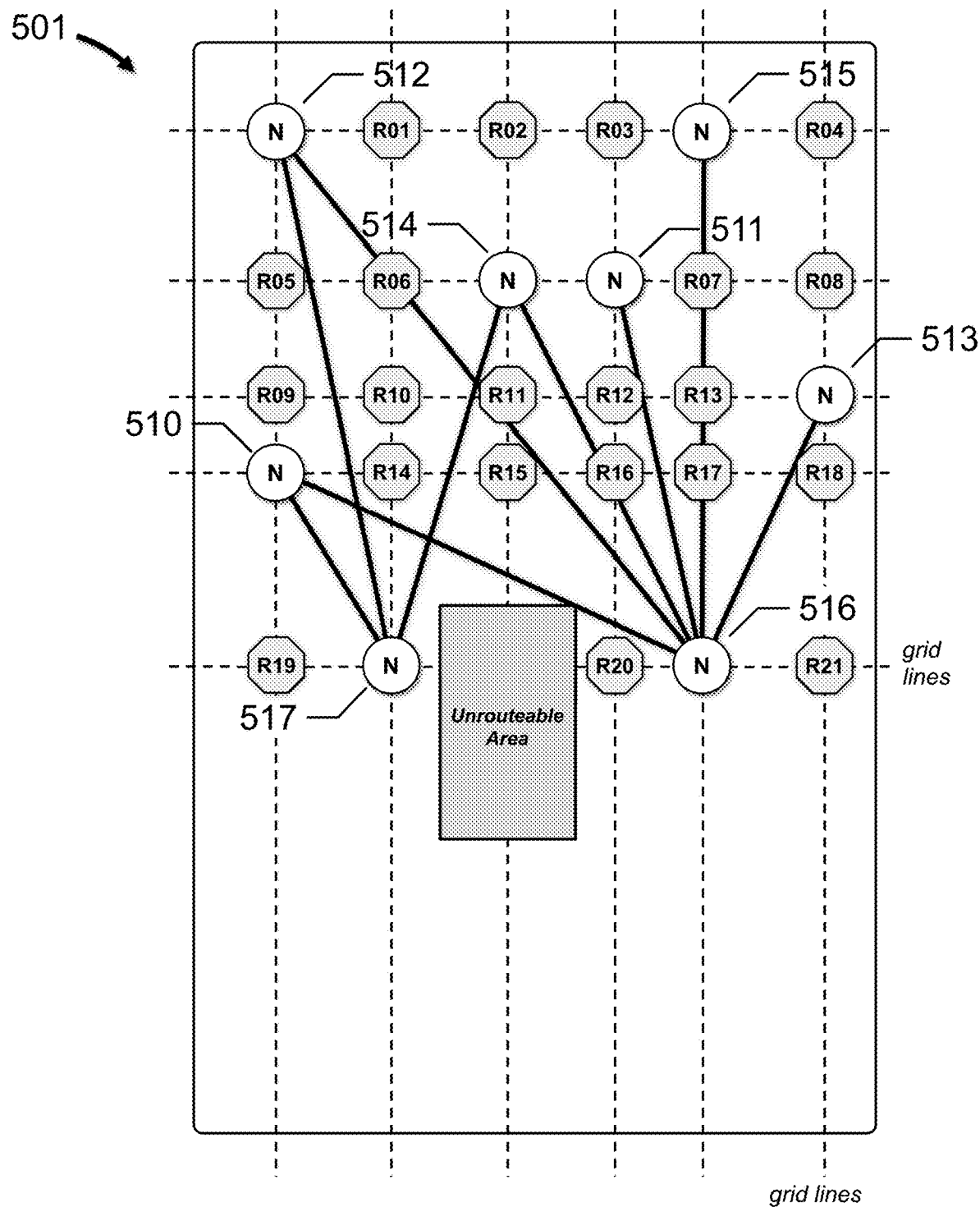
FIGS. 6B to 6F depict a series of graphs, grids and topologies for the TG depicted in FIG. 6A, in accordance with an embodiment of the present disclosure.

FIG. 6B depicts Hanan grid 501 for TG 500.

Nodes 510 to 517 are located at respective intersections, and a router is added to the grid at each intersection not occupied by a node. In this embodiment, 21 routers are added to the grid, i.e., router R01 to R21. Adjacent nodes and routers are then connected to create an initial mesh or topology.

Figure 6C:
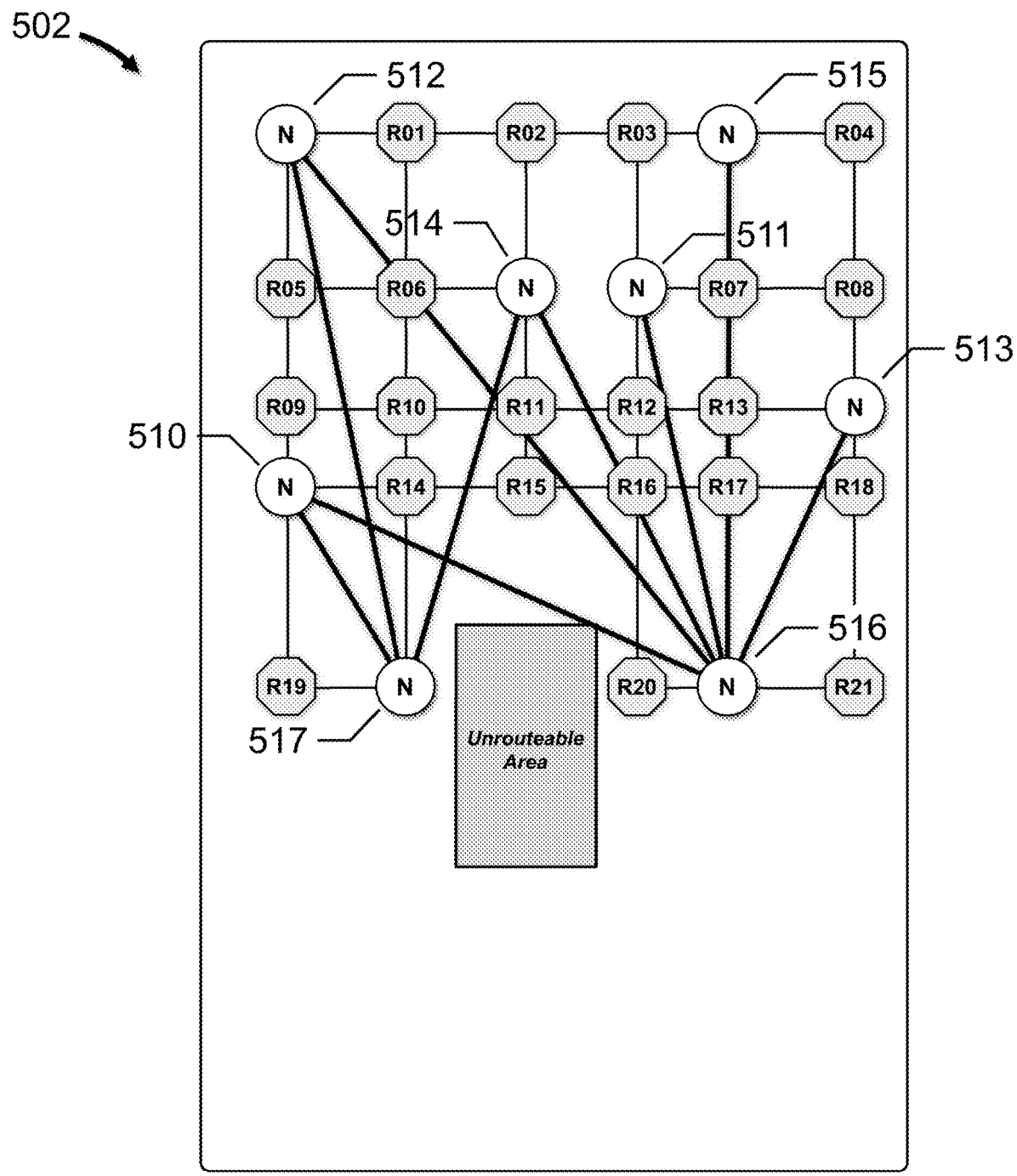

FIG. 6C depicts an initial mesh or topology 502 for TG 500.

Node 510 is connected to routers R09, R14 and R19. Node 511 is connected to routers R03, R07 and R12. Node 512 is connected to routers R01 and R05. Node 513 is connected to routers R08, R13 and R18. Node 514 is connected to routers R02, R06 and R11. Node 515 is connected to routers R03, R04, R07. Node 516 is connected to routers R17, R20 and R21. Node 517 is connected to routers R14 and R19.

Router R01 is connected to node 512 and routers R02 and R06. Router R02 is connected to node 514 and routers R01 and R03. Router R03 is connected to nodes 511 and 515 and router R02. Router R04 is connected to node 515 and router R08. Router R05 is connected to node 512 and routers R06 and R09. Router R06 is connected to node 514 and routers R01, R05 and R10. Router R07 is connected to node 511 and 515 and routers R08 and R13. Router R08 is connected to node 513 and routers R04 and R07. Router R09 is connected to node 510 and routers R05 and R10. Router R10 is connected to routers R06, R09, R11 and R14. Router R11 is connected to node 514 and routers R10, R12 and R15. Router R12 is connected to node 511 and routers R11, R13 and R16. Router R13 is connected to node 513 and routers R07, R12 and R17. Router R14 is connected to nodes 510 and 517 and routers R10 and R15. Router R15 is connected to routers R11, R14 and R16. Router R16 is connected to routers R12, R15, R17 and R20. Router R17 is connected to node 516 and routers R13, R16 and R18. Router R18 is connected to node 513 and routers R17 and R21. Router R19 is connected to nodes 510 and 517. Router R20 is connected to node 516 and router R16. Router R21 is connected to node 516 and router R18.

A weight is then calculated for each connection, based on the traffic data, to create a weighted mesh or topology. In one embodiment, a traffic criticality index (TCI) is calculated for each traffic flow, and the TCI for each traffic flow is then added to a heating index for each connection that falls within a rectilinear bounding box for that traffic flow. The TCI may be based on traffic criticality and rate. The rectilinear bounding box for a particular traffic flow is defined by the source node (source bridge port) and the destination node (destination bridge port) of that traffic flow. In one embodiment, the weight for each connection is inversely proportional to the heating index for that connection, while in another embodiment, the weight is proportional to the heating index. The weights are then applied to the initial mesh or topology to create the weighted mesh or topology.

Figure 6D:
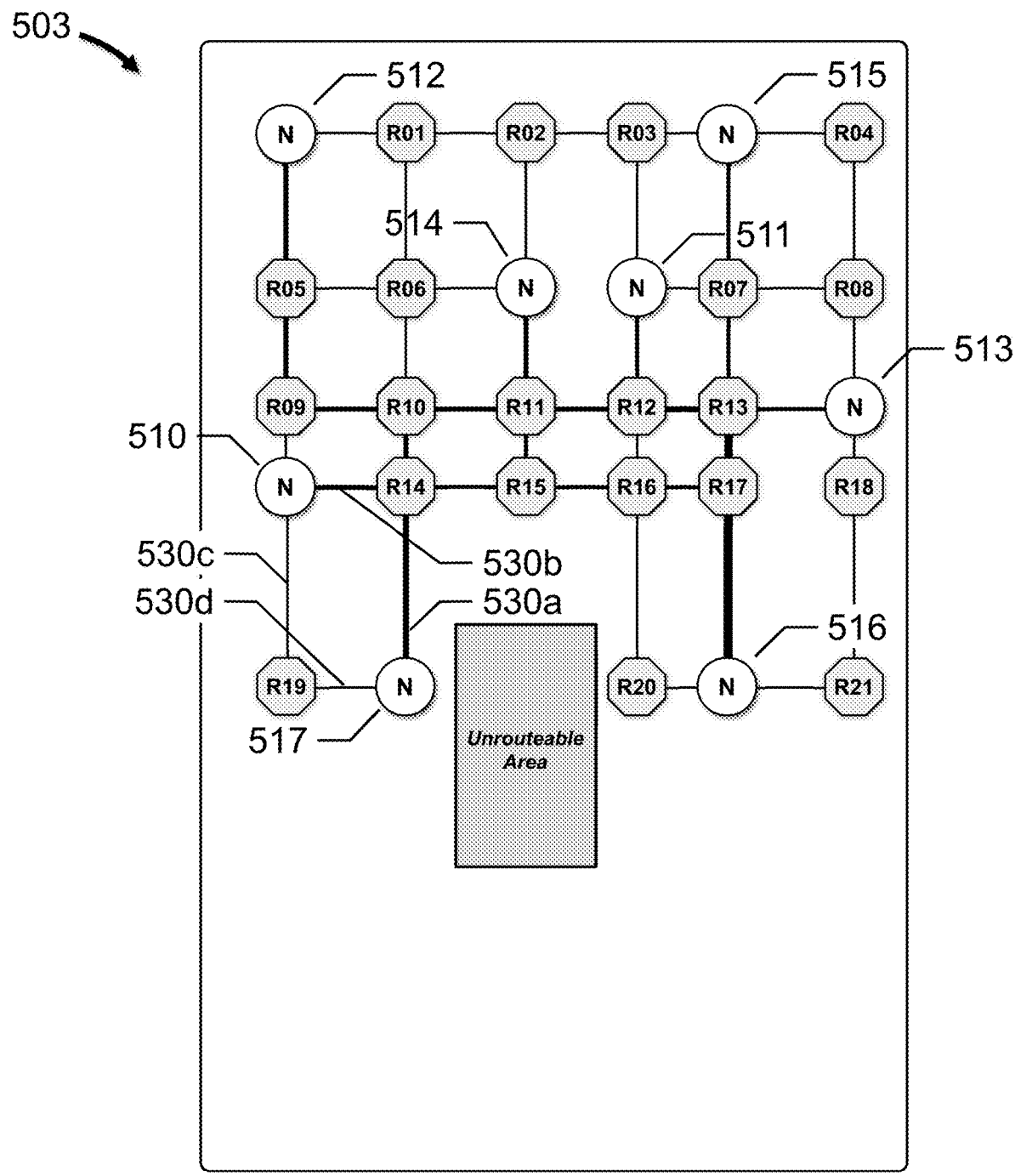

FIG. 6D depicts a weighted mesh or topology 503 for TG 500.

The different weights for each connection are represented by different line thicknesses. The thinnest lines represent connections through which traffic does not flow. For example, edge 530 is associated with traffic flow set 330, which includes at least one traffic flow between node 517 (bridge port 317a) and node 510 (bridge port 310a). The rectilinear bounding box for traffic flow set 330 is defined by node 510 and node 517, represented by connections 530a, 530b, 530c and 530d. The weight for connections 530c and 530d are the lowest, the weight for connections 530a and 530b are greater than the weight for connections 530c and 530d. Notably, the weight for connection 530a includes contributions from edges 530, 531 and 532, and the weight for connection 530b includes contributions from edges 520 and 530.

A degree-constrained minimum-cost mesh or topology is then determined based on the weighted mesh or topology, including removing one or more connections and one or more routers. In one embodiment, a degree-constrained minimum-cost Steiner tree is determined, which generates a plurality of trees, based on the degree and the number of nodes, and then selects the lowest cost tree. The connections and routers through which traffic does not flow are then removed from the degree-constrained minimum-cost mesh or topology.

Figure 6E:
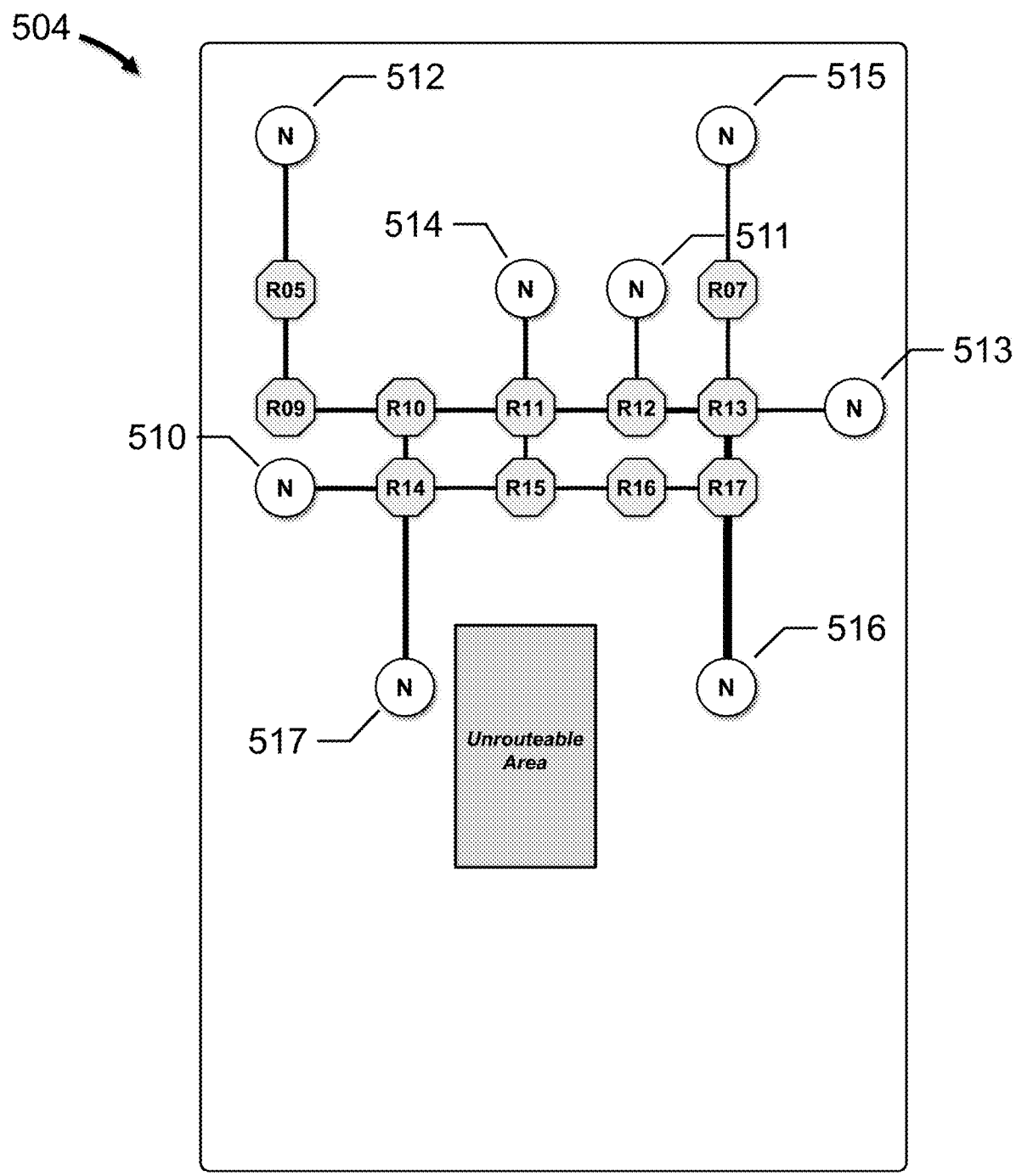

FIG. 6E depicts a degree-constrained minimum-cost mesh or topology 504 for TG 500.

Degree-constrained minimum-cost topology 504 includes nodes 510 to 517, and routers R05, R07 and R09 to R17. The connection weights are the same as FIG. 6D.

Node 510 is connected to router R14, node 511 is connected to router R12, node 512 is connected to router R05, node R13 is connected to router R13, node 514 is connected to router R11, node 515 is connected to router R07, node 516 is connected to router R17, and node 517 is connected to router R14.

Router R05 is connected to node 512 and router R05. Router R07 is connected to node 515 and router R13. Router R09 is connected to routers R05 and R10. Router R10 is connected to routers R09, R11 and R14. Router R11 is connected to node 514 and routers R10, R12 and R15. Router R12 is connected to node 511 and routers R11 and R13. Router R13 is connected to node 513 and routers R07, R12 and R17. Router R14 is connected to nodes 510 and 517 and routers R10 and R15. Router R15 is connected to routers R11, R14 and R16. Router R16 is connected to routers R15 and R17. Router R17 is connected to node 516 and routers R13 and R16.

A candidate topology is then generated from the degree-constrained minimum-cost tree.

Figure 6F:
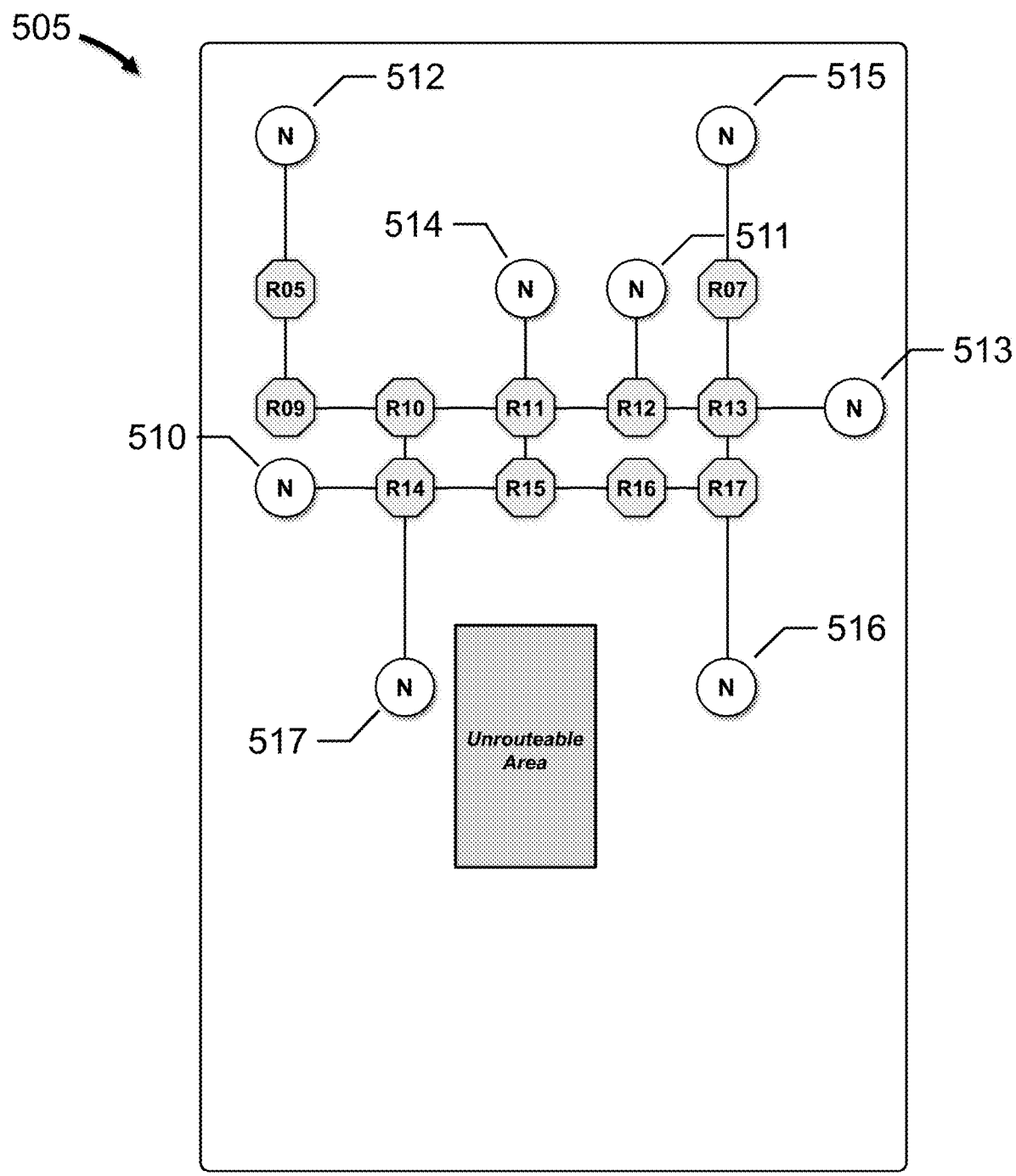

FIG. 6F depicts a candidate topology 505 for TG 500.

Candidate topology 505 includes nodes 510 to 517, and routers R05, R07 and R09 to R17. The connections between the nodes and the routers are the same as FIG. 6D. Generally, a user may view grids 501 and topologies 502 to 505 on display 152.

Referring back to FIG. 3, at 234, the final topology is generated.

At 235, the candidate topologies are then merged to create a merged candidate topology, and the routers are initially merged within the merged candidate topology to generate a baseline topology. In this embodiment, candidate topology 505 is also the merged candidate topology 505.

At 236, the routers are merged and the baseline topology is generated.

Figure 7:
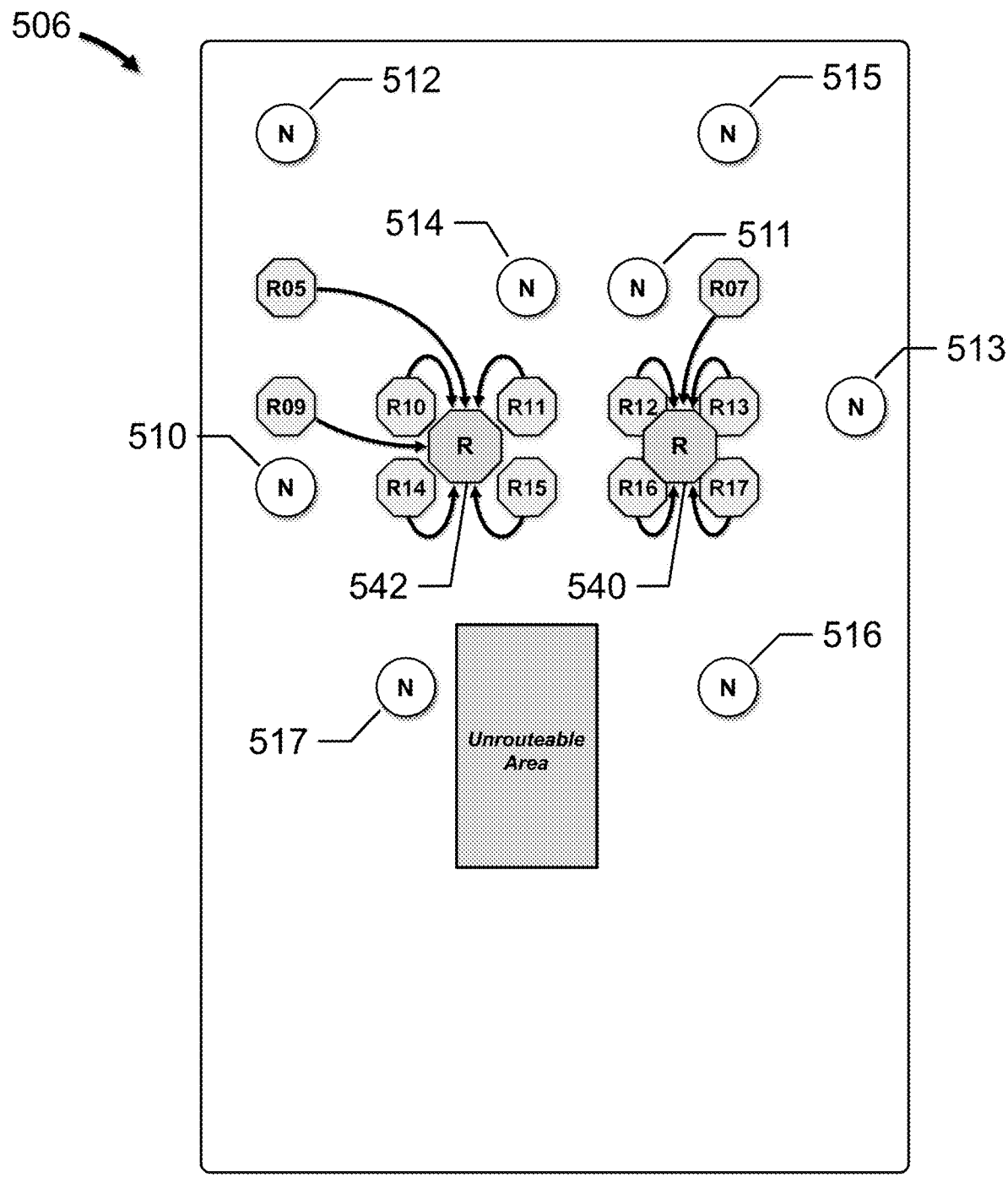
FIG. 7 depicts router merging for the merged candidate topology, in accordance with an embodiment of the present disclosure.

FIG. 7 depicts router merging for merged candidate topology 505, in accordance with an embodiment of the present disclosure.

Router merging diagram 506 illustrates a process for merging routers in merged candidate topology 505. Generally, routing merging reduces the number of routers in the topology by merging or combining two or more routers into a single router. Merged routers may also be relocated, i.e., placed at a location that does not correspond to any of the grid locations of the original routers. Router relocation may occur after the candidate topologies for each color have been merged, and/or during a later optimization process.

Routers R12, R13, R16 and R17 have been merged into centrally located router 540. Router R07 has also been merged into router 540. Similarly, routers R10, R11, R14 and R15 have been merged into centrally located router 542. Routers R05 and R09 have also been merged into router 542.

Figure 8:
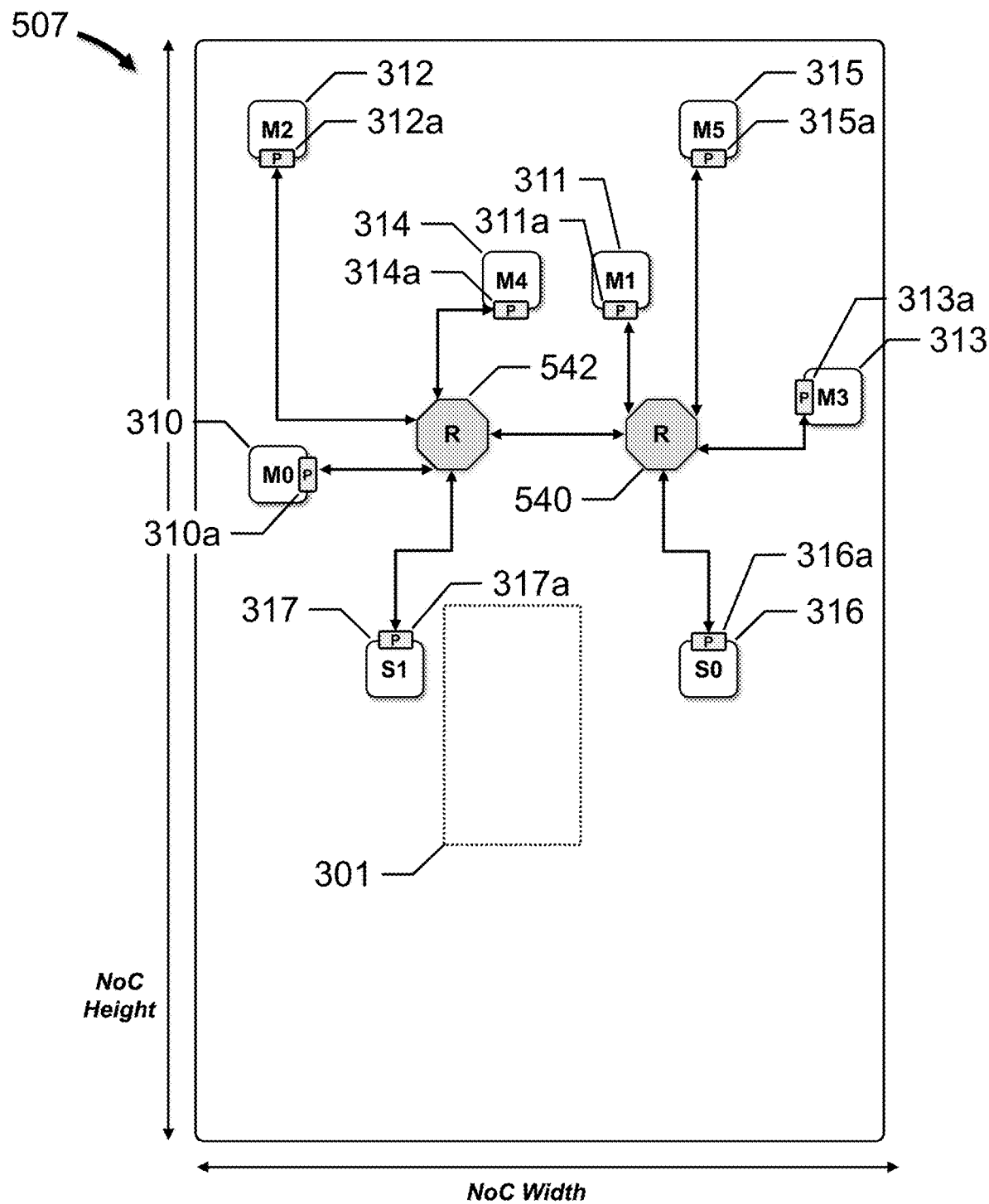
FIG. 8 depicts a baseline topology for a NoC, in accordance with an embodiment of the present disclosure.

FIG. 8 depicts baseline topology 507 for NoC 300, in accordance with an embodiment of the present disclosure. A user may view baseline topology 507 on display 152.

Baseline topology 507 has the same NoC height and width as NoC 300, and includes unrouteable area 301 located within a central portion of baseline topology 507. Device 310 is connected to router 542 through bridge port 310a. Device 311 is connected to router 540 through bridge port 311a. Device 312 is connected to router 542 through bridge port 312a. Device 313 is connected to router 540 through bridge port 313a. Device 314 is connected to router 542 through bridge port 314a. Device 315 is connected to router 540 through bridge port 315a. Device 316 is connected to router 540 through bridge port 316a. Device 317 is connected to router 542 through bridge port 317a.

In many embodiments, baseline topology 507 is determined by NoC synthesis module 134 based on the method described above. In other embodiments, baseline topology 507 may be developed by a different software module 136, a different computer system, etc., and retrieved from memory 130, received by computer 100, etc.

In many NoCs with PCIe traffic, a large number of traffic classes may be required to avoid PCIe deadlock conditions and to segregate traffic for high throughput designs, even when PCIe traffic receives the highest priority. As noted above, clock-frequency requirements, area constraints, placement and routing (P&R) restrictions, etc., pose additional system limitations on the NOC topology such as, for example, the available router ports, the number of virtual channels (VCs), the link-size, etc. Eliminating HoLs for NoC topologies with large numbers of traffic classes poses a challenge because the traffic classes processed by many routers may require a combination of router ports and VCs, i.e., an {edge, VC} combination, that exceeds the number of available ports and/or VCs on the router, resulting in an inevitable conflict.

Embodiments of the present disclosure advantageously improve NoC performance when certain devices, such as ASNIs, are restricted to communicating over a single VC using different traffic classes, honor external protocol dependencies, such as those introduced by a PCIe root-complex, without leading to deadlock, and generate NoCs with minimal loss of performance in designs with large numbers of traffic classes and port-limited routers.

More particularly, embodiments of the present disclosure advantageously identify routers that process more traffic classes than can be supported by the router's available {edge, VC} combinations, generate a traffic class affinity graph (TCAG) for each identified router, generate traffic class combinations for the identified routers, merge traffic classes of the identified routers based on the traffic class combinations, determine a final {edge, VC} combination for each identified router based on the merged traffic classes, and generate a final topology based, at least in part, on the merged traffic classes and the final {edge, VC} combinations for the identified routers. In many embodiments, routers may be added to the topology.

Referring back to FIG. 3, at 237, routers that process more traffic classes than can be supported by the router's available {edge, VC} combinations are identified. In certain embodiments, the baseline topology and associated traffic flow data may be received from a different computer system, read from memory 130, etc., rather than generated by the process described above.

Figure 9A:
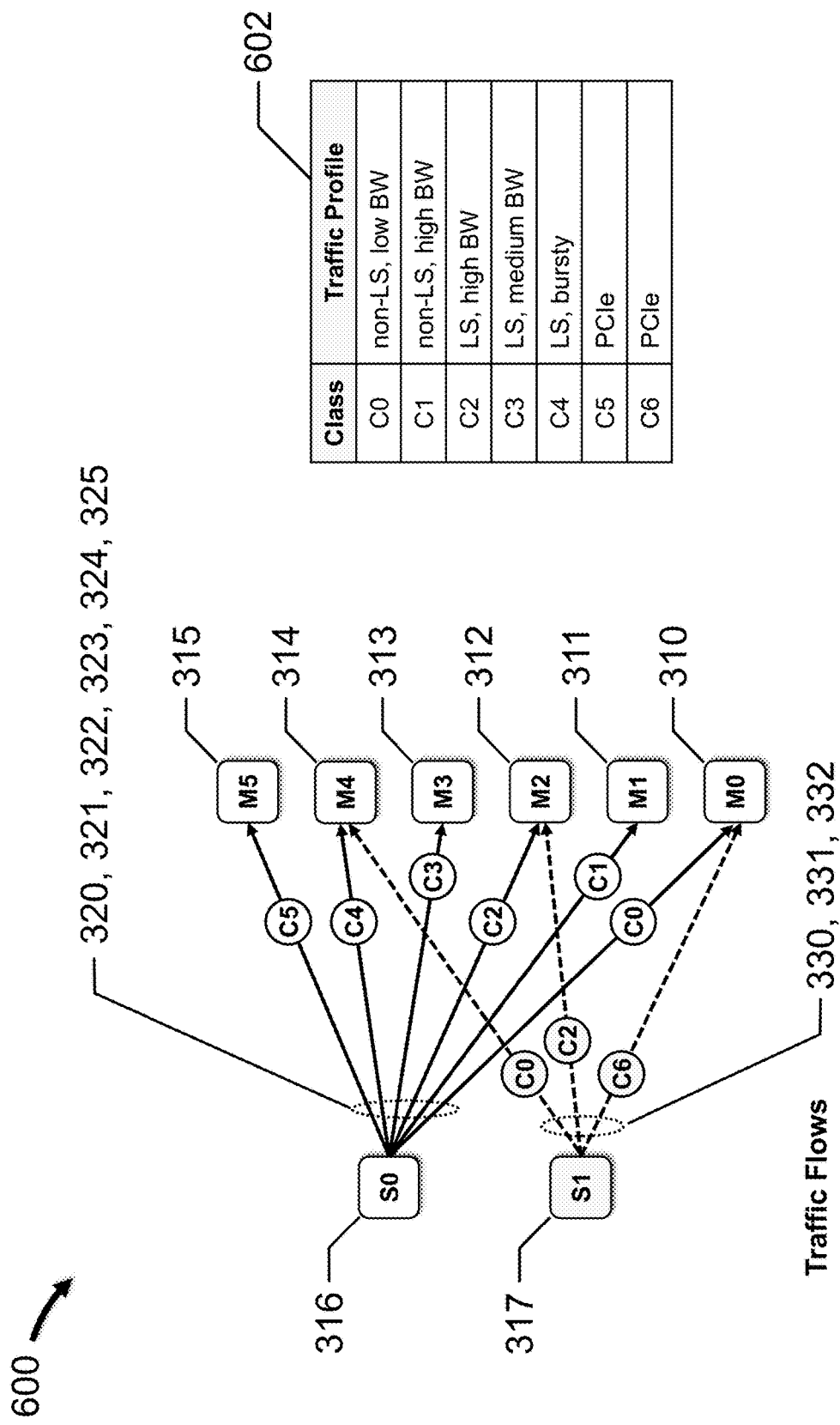
FIG. 9A depicts a traffic flow view of the traffic flows within a NoC, in accordance with an embodiment of the present disclosure.

FIG. 9A depicts a traffic flow view 600 of the traffic flows within NoC 300, in accordance with an embodiment of the present disclosure.

Traffic flow view 600 depicts devices 310 to 317, and traffic flow sets 320, 321, 322, 323, 324, 325, 330, 331 and 332. In this embodiment, each traffic flow set represents a single traffic flow that has been assigned one of seven traffic classes, i.e., traffic class C0, C1, C2, C3, C4, C5 or C6. As provided in traffic class table 602, traffic class C0 includes non-LS low bandwidth (BW) traffic, traffic class C1 includes non-LS high BW traffic, traffic class C2 includes LS high BW traffic, traffic class C3 includes LS medium BW traffic, traffic class C4 includes LS bursty traffic, and traffic classes C5 and C6 include PCIe traffic.

More particularly, traffic flow 320 has been assigned traffic class C0, traffic flow 321 has been assigned traffic class C1, traffic flow 322 has been assigned traffic class C2, traffic flow 323 has been assigned traffic class C3, traffic flow 324 has been assigned traffic class C4, and traffic flow 325 has been assigned traffic class C5. Similarly, traffic flow 330 has been assigned traffic class C6, traffic flow 331 has been assigned traffic class C2, and traffic flow 332 has been assigned traffic class C0.

Figure 9B:
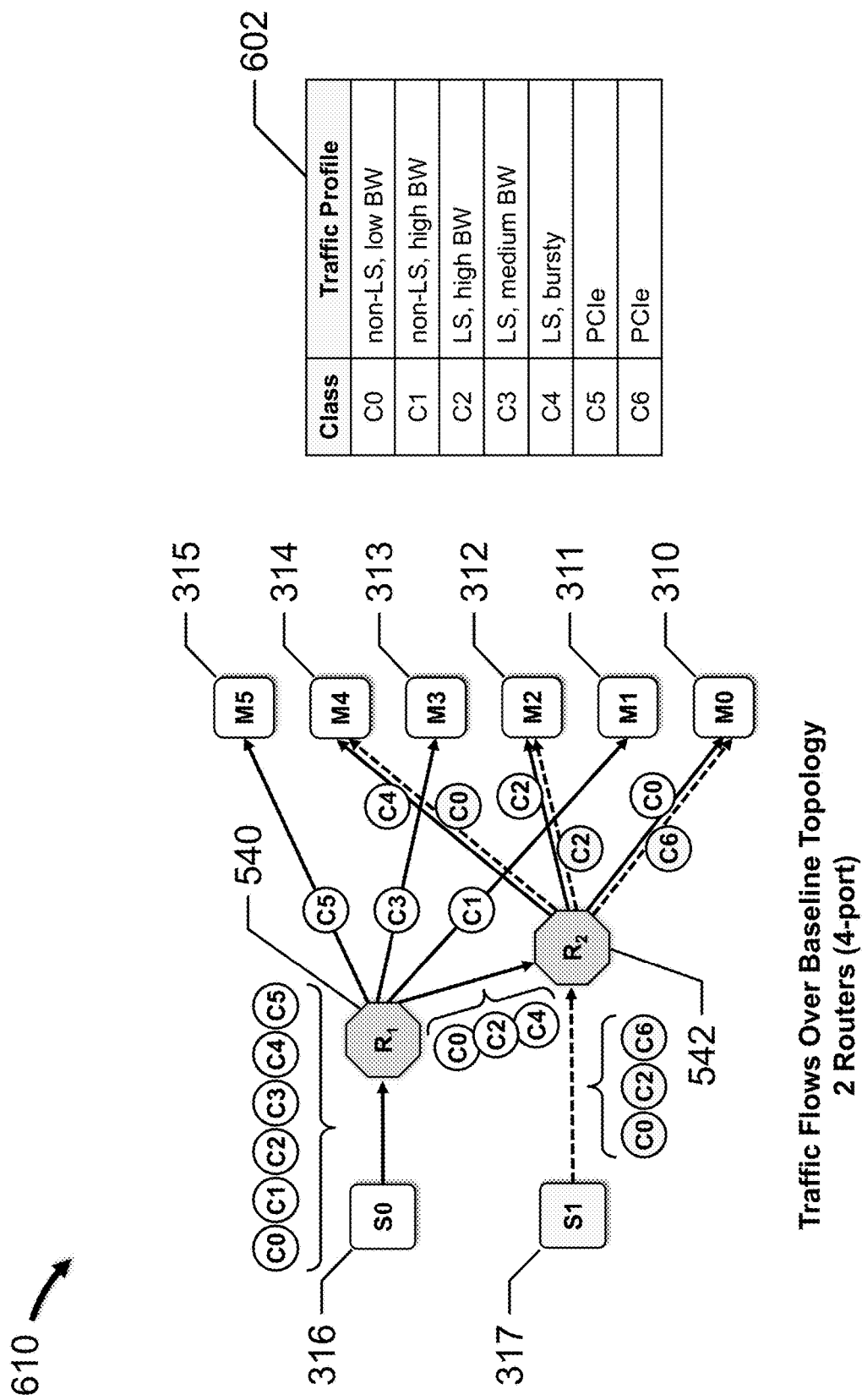
FIG. 9B depicts a traffic flow view of the traffic flows over a baseline topology of a NoC, in accordance with an embodiment of the present disclosure.

FIG. 9B depicts traffic flow view 610 of the traffic flows over baseline topology 507 of NoC 300, in accordance with an embodiment of the present disclosure.

Generally, a router has "m" incoming links and "n" outgoing links, each of which may carry one or more traffic classes. In many embodiments, a router has up to 8 input ports, up to 8 output ports and may support up to 4 VCs in order to meet timing requirements. An {edge, VC} combination for a particular router includes the number of available router ports, i.e., the "edge" number, and the number of available virtual channels, i.e., the "VC" number. For example, the {edge, VC} combinations for a router with 8 input ports and 8 output ports may be {8 ports, 1 VC}, {4 ports, 2 VCs}, etc. While the following discussion focuses on the output (transmit) side of the routers, i.e., the outgoing links, the same principles apply to the input (receive) side of the routers, i.e., the incoming links.

In baseline topology 507, routers 540 and 542 are 4 port routers that support 2 VCs. The available {edge, VC} combinations for these routers include {4 ports, 2 VCs}, {4 ports, 1 VC}, {3 ports, 2 VCs}, {3 ports, 1 VC}, {2 ports, 2 VCs}, {2 ports, 1 VC}, {1 port, 2 VCs} and {1 port, 1 VC}.

Router 540 receives six traffic classes from device 316, i.e., C0, C1, C2, C3, C4 and C5, while router 542 receives three traffic classes from device 317, i.e., C0, C2 and C6. Router 540 outputs traffic class C5 to device 315 using one VC, outputs traffic class C3 to device 313 using one VC, and outputs traffic class C1 to device 311 using one VC. Router 540 also outputs traffic classes C0, C2 and C4 to router 542 using three VCs. In this embodiment, router 540 does not have an available {edge, VC} combination to transmit the received traffic classes, i.e., {4 ports, 6 VCs}. Router 542 outputs traffic classes C4 and C0 to device 314 over two VCs, outputs traffic class C2 (×2) to device 312 over two VCs, and outputs traffic classes C6 and C0 to device 310 over two VCs. Similarly, router 542 does not have an available {edge, VC} combination to transmit the received traffic classes, i.e., {3 ports, 6 VCs}.

Referring back to FIG. 3, at 237, after the routers are identified, a Traffic Class Affinity Graph (TCAG) is generated for each identified router. In many embodiments, a TCAG is a graph with nodes that are connected by edges. Each node corresponds to a traffic entry for the router, and each traffic entry has a traffic class. Each edge connects two nodes, and has a weight that indicates the degree to which the traffic classes of the respective nodes are combinable, i.e., the "affinity" to combine the respective traffic classes. For example, the higher the weight, the higher the affinity or possibility of combining the traffic classes together.

The affinity between traffic classes may be expressed by a number of characteristics, such as, for example, the latency sensitivity (LS) of the traffic, the burst length of the traffic, the packet rates of the traffic, the watermark value of the traffic, etc. LS traffic classes have a low affinity to be combined with non-LS traffic classes because the combination would increase delays for the LS traffic classes. Traffic classes with high burst lengths have a low affinity to be combined together because the combination may degrade performance and increase latency for both. Similarly, traffic classes with high packet rates have a low affinity to be combined together because the combination may degrade performance and increase latency for both. On the other hand, traffic classes with a watermark value that is less than a watermark threshold may have a high affinity to be combined because these traffic classes generally have low priority and no requirements on latency.

Figure 9C:
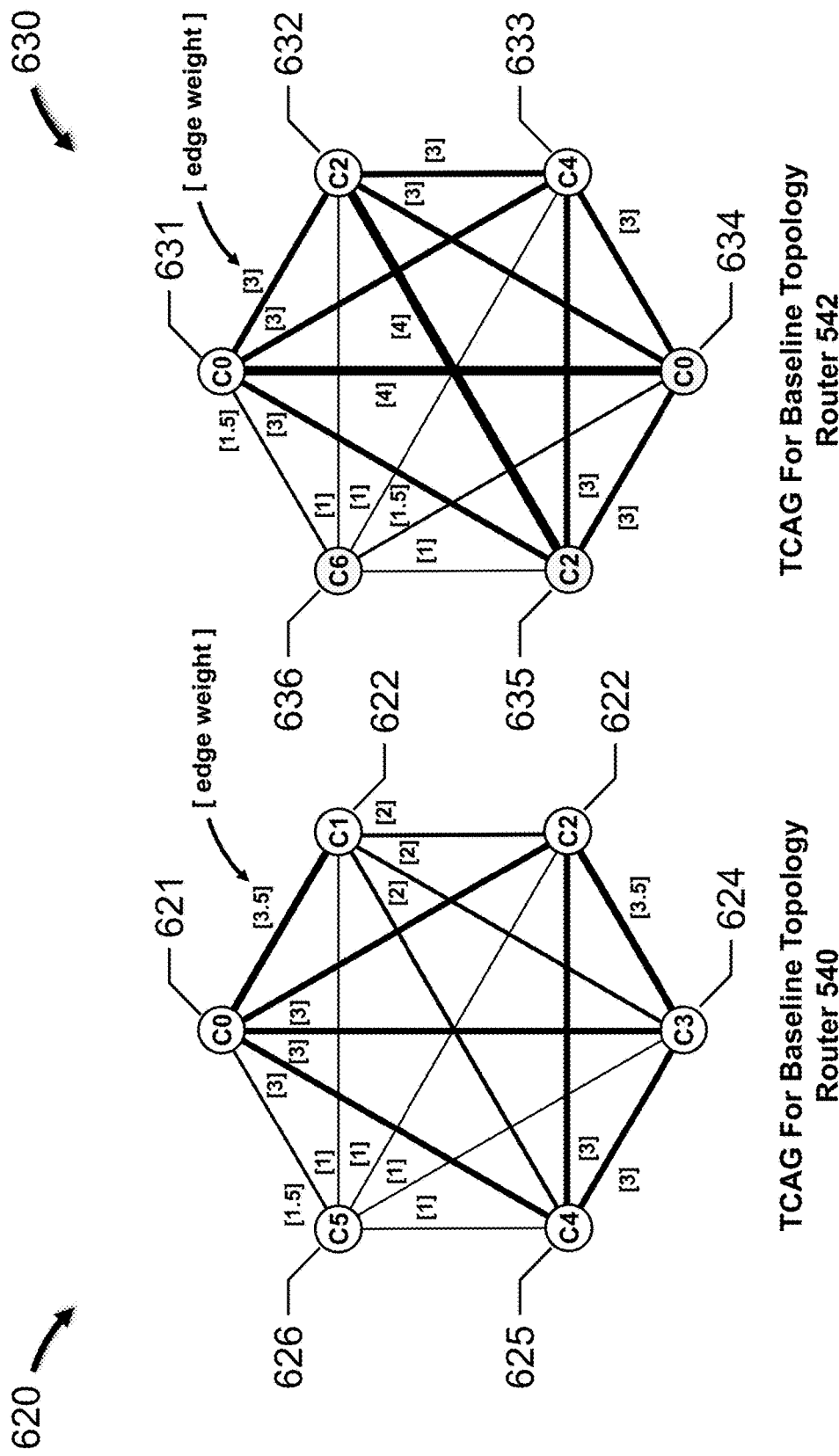
FIG. 9C depicts Traffic Class Affinity Graphs (TCAGs) for two routers, in accordance with an embodiment of the present disclosure.

FIG. 9C depicts TCAGs 620 and 630 for routers 540 and 542, respectively, in accordance with an embodiment of the present disclosure.

TCAG 620 includes nodes 621, 622, 623, 624, 625 and 626, each node corresponding to a traffic class received from device 316, i.e., traffic classes C0, C1, C2, C3, C4 and C5, respectively. TCAG 630 includes nodes 631, 632, 633, 634, 635 and 636, each node corresponding to a traffic class received from router 540 and device 317, i.e., traffic classes C0, C2, C4, C0, C2 and C6, respectively. Each pair of nodes is connected by an edge that has a weight that indicates a degree to which the traffic classes of the nodes are combinable. In many embodiments, the weight is the traffic-class affinity metric value for the nodes. TCAG 620 includes 15 edges between nodes 621, 622, 623, 624, 625 and 626, and TCAG 620 includes 15 edges between nodes 631, 632, 633, 634, 635 and 636. The weights for each edge are depicted in brackets.

In many embodiments, the traffic-class affinity metric value for a pair of nodes may be determined based on one or more affinity characteristics, i.e., the LS of the traffic classes of the nodes, the watermark values of the traffic classes of the nodes, the packet rates of the traffic classes of the nodes, the burst lengths of the traffic classes of the nodes, etc. For example, the traffic-class affinity metric value may be proportional to an unsigned integer value that is divided into a number of bit fields, one for each affinity characteristic. In one embodiment, the traffic-class affinity metric value is defined as the inverse of a 16-bit unsigned integer value, inv_aff[15:0], that is divided into 4 bit fields, one for each affinity characteristic.

The first bit field, inv_aff[15], is 1 bit in length, relates the LS values of the traffic classes of the nodes, and is defined by Equation 1:

$$inv\_aff[15]=XOR(LS(tc_1),LS(tc_2)) \quad \text{Eq. 1}$$

where $LS(tc_1)$ is the LS value of the traffic class of the first node ($tc_1$), $LS(tc_2)$ is the LS value of the traffic class of the second node ($tc_2$), non-LS traffic has an LS value of 0, LS traffic has an LS value of 1, and XOR is the "exclusive or" function.

The second bit field, inv_aff[14:11], is 4 bits in length, relates the watermark values of the traffic classes of the nodes, and is defined by Equation 2:

$$inv\_aff[14:11]=QUANT(MAX(\text{Watermark}(tc_1), \text{Watermark}(tc_2)),4), \text{ and Watermark}(tc_i)=MAX(\text{WatermarkThreshold},tp_i) \quad \text{Eq. 2}$$

where the WatermarkThreshold defines the value below which traffic classes have a high affinity to be combined (e.g., an integer value such as 2), and $tp_i$ is the traffic priority of traffic class $tc_i$ (e.g., an integer value from 0 to 6), MAX is the "maximum" function, and QUANT(x, 4) is a function that quantizes "x" to 4 bits.

The third bit field, inv_aff[10:5], is 6 bits in length, relates the packet rates of the traffic classes of the nodes, and is defined by Equation 3:

$$inv\_aff[10:5]=QUANT((R_p(tc_1)+R_p(tc_2)),6) \quad \text{Eq. 3}$$

where $R_p(tc_1)$ is the packet rate of the traffic class of the first node ($tc_1$), $R_p(tc_2)$ is the packet rate of the traffic class of the second node ($tc_2$), and QUANT(x, 6) represents a quantization of "x" to 6 bits.

The fourth bit field, inv_aff[4:0], is 5 bits in length, relates the burst lengths of the traffic classes of the nodes, and is defined by Equation 4:

$$inv\_aff[10:5]=QUANT((L_b(tc_1)+L_b(tc_2)),6) \quad \text{Eq. 4}$$

where $L_b(tc_1)$ is the burst length of the traffic class of the first node ($tc_1$), $L_b(tc_2)$ is the burst length of the traffic class of the second node ($tc_2$), and QUANT(x,6) represents a quantization of "x" to 6 bits.

For purposes of illustration, various weights have been assigned to the edges in TCAGs 620 and 630.

For node 621, the edge weight between nodes 621 and 622 is 3.5, indicating a high affinity to combine traffic classes C0 and C1. The edge weight between nodes 621 and 623 is 3, indicating a medium affinity to combine traffic classes C0 and C2. The edge weight between nodes 621 and 624 is 3, indicating a medium affinity to combine traffic classes C0 and C3. The edge weight between nodes 621 and 625 is 3, indicating a medium affinity to combine traffic classes C0 and C4. The edge weight between nodes 621 and 626 is 3, indicating a medium affinity to combine traffic classes C0 and C4.

For node 622, the edge weight between nodes 622 and 623 is 2, indicating a low affinity to combine traffic classes C1 and C2. The edge weight between nodes 622 and 624 is 2, indicating a low affinity to combine traffic classes C1 and C3. The edge weight between nodes 622 and 625 is 2, indicating a low affinity to combine traffic classes C1 and C4. The edge weight between nodes 622 and 626 is 1, indicating a very low affinity to combine traffic classes C1 and C5.

For node 623, the edge weight between nodes 623 and 624 is 3.5, indicating a high affinity to combine traffic classes C2 and C3. The edge weight between nodes 623 and 625 is 3, indicating a medium affinity to combine traffic classes C2 and C4. The edge weight between nodes 623 and 626 is 1, indicating a very low affinity to combine traffic classes C2 and C5.

For node 624, the edge weight between nodes 624 and 625 is 3, indicating a medium affinity to combine traffic classes C3 and C4. The edge weight between nodes 624 and 626 is 1, indicating a very low affinity to combine traffic classes C3 and C5.

For node 625, the edge weight between nodes 625 and 626 is 1, indicating a very low affinity to combine traffic classes C4 and C5.

For node 631, the edge weight between nodes 631 and 632 is 3, indicating a medium affinity to combine traffic classes C0 and C2. The edge weight between nodes 631 and 633 is 3, indicating a medium affinity to combine traffic classes C0 and C4. The edge weight between nodes 631 and 634 is 4, indicating a very high affinity to combine traffic classes C0 and C0. The edge weight between nodes 631 and 635 is 3, indicating a medium affinity to combine traffic classes C0 and C2. The edge weight between nodes 631 and 636 is 3, indicating a medium affinity to combine traffic classes C0 and C6.

For node 632, the edge weight between nodes 632 and 633 is 3, indicating a medium affinity to combine traffic classes C2 and C4. The edge weight between nodes 632 and 634 is 3, indicating a medium affinity to combine traffic classes C2 and C0. The edge weight between nodes 632 and 635 is 4, indicating a very high affinity to combine traffic classes C2 and C2. The edge weight between nodes 632 and 636 is 1, indicating a very low affinity to combine traffic classes C2 and C6.

For node 633, the edge weight between nodes 633 and 634 is 3, indicating a medium affinity to combine traffic classes C4 and C0. The edge weight between nodes 633 and 635 is 3, indicating a medium affinity to combine traffic classes C4 and C2. The edge weight between nodes 633 and 636 is 1, indicating a very low affinity to combine traffic classes C4 and C6.

For node 634, the edge weight between nodes 634 and 635 is 3, indicating a medium affinity to combine traffic classes C0 and C2. The edge weight between nodes 634 and 636 is 3, indicating a medium affinity to combine traffic classes C0 and C6.

For node 635, the edge weight between nodes 635 and 636 is 1, indicating a very low affinity to combine traffic classes C2 and C6.

Referring back to FIG. 3, at 237, after the TCAGs have been generated, traffic class traffic class combinations are then generated for the identified routers based on the TCAGs and the {edge, VC} combinations. In many embodiments, a k-way minimum cost partitioning is performed to generate traffic class combinations for each identified router. In one embodiment, the traffic class partition may be defined by Equation 5:

$$\text{traffic\_class\_partition}=\text{min\_cost\_partition}(TCAG_i,k) \quad \text{Eq. 5}$$

where k is the available {edge, VC} combinations for each $\text{router}_i$.

Figure 10A:
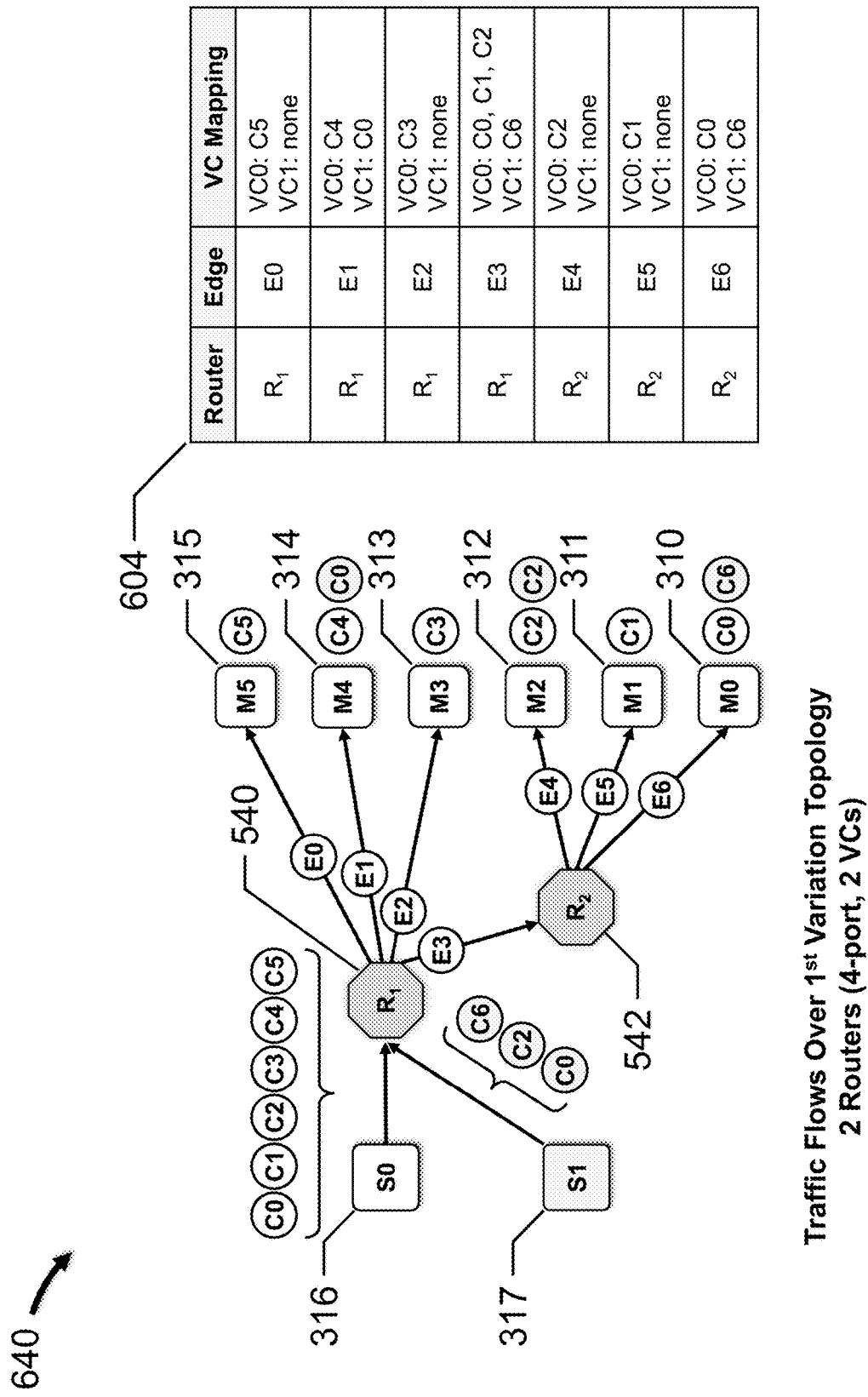
FIG. 10A depicts a traffic flow view of the traffic flows over a first variation topology of a NoC, in accordance with an embodiment of the present disclosure.

FIG. 10A depicts traffic flow view 640 of the traffic flows over a first variation topology of NoC 300, in accordance with an embodiment of the present disclosure.

After one or more iterations of the k-way minimum cost partitioning process for each identified router, a first variation of the baseline topology 507 may be generated. In this variation, router 540 not only receives all of the traffic classes from device 316, i.e., traffic classes C0, C1, C2, C3, C4 and C5, but also all of the traffic classes from device 317, i.e., traffic classes C0, C2 and C6. Additionally, router 540 is now coupled to devices 313, 314 and 315 and router 542, while router 542 is now coupled to devices 310, 311 and 312. The {edge, VC} combination and VC mappings for routers 540 and 542 are provided in mapping table 604. Router 540 has 4 edges, i.e., edges E0, E1, E2 and E3, and two VCs per edge, i.e., VC0 and VC1, while router 542 has 3 edges, i.e., edges E4, E5 and E6, and two VCs per edge, i.e., VC0 and VC1.

While one VC carries more than one traffic class, i.e., VC0 of edge E3, the remaining VCs carry one or zero (i.e., none) traffic classes. The combination of traffic classes for this VC, i.e., traffic classes C0, C1 and C2, was determined based on TCAG 620 for router 540, which depicts an edge weight of 3.5 between traffic classes C0 and C1, and an edge weight of 3 between traffic classes C2 and C0, and an edge weight of 2 between traffic classes C1 and C2. The affinity between traffic classes C0 and C1 is high due, at least in part, to the non-LS traffic and different bandwidths. The affinity between traffic classes C0 and C2 is medium, due, at least in part, to the LS and non-LS traffic and different bandwidths. And, the affinity between traffic classes C1 and C2 is low, due, at least in part, to the LS and non-LS traffic and similar bandwidths.

For router 540, traffic class C5 is output over edge E0 and VC0 to device 315. Traffic class C4 is output over edge E1 and VC0 to device 314, and traffic class C0 is output over edge E1 and VC1 to device 314. Traffic class C3 is output over edge E2 and VC0 to device 313. Traffic classes C0, C1 and C2 are output over edge E3 and VC0 to router 542, and traffic class C6 is output over edge E3 and VC1 to router 542. For router 542, traffic class C2 is output over edge E4 and VC0 to device 312. Traffic class C1 is output over edge E5 and VC0 to device 311. Traffic class C0 is output over edge E6 and VC0 to device 310, and traffic class C6 is output over edge E6 and VC1 to device 310.

In certain embodiments, the {edge, VC} and traffic combinations provided in mapping table 604 are the final {4 edge, 2 VC} combination and traffic combinations for router 540 and the final {3 edge, 2 VC} combination and traffic combinations for router 542. All of these final EVC combinations are available {edge, VC} combinations for these routers, as described above. In this embodiment, traffic classes C0, C1 and C2 output over edge E3 and VC0 were combined. In other embodiments, further iterations of the k-way minimum cost partitioning process may be performed to refine the final {edge, VC} combinations and traffic class combinations.

Figure 10B:
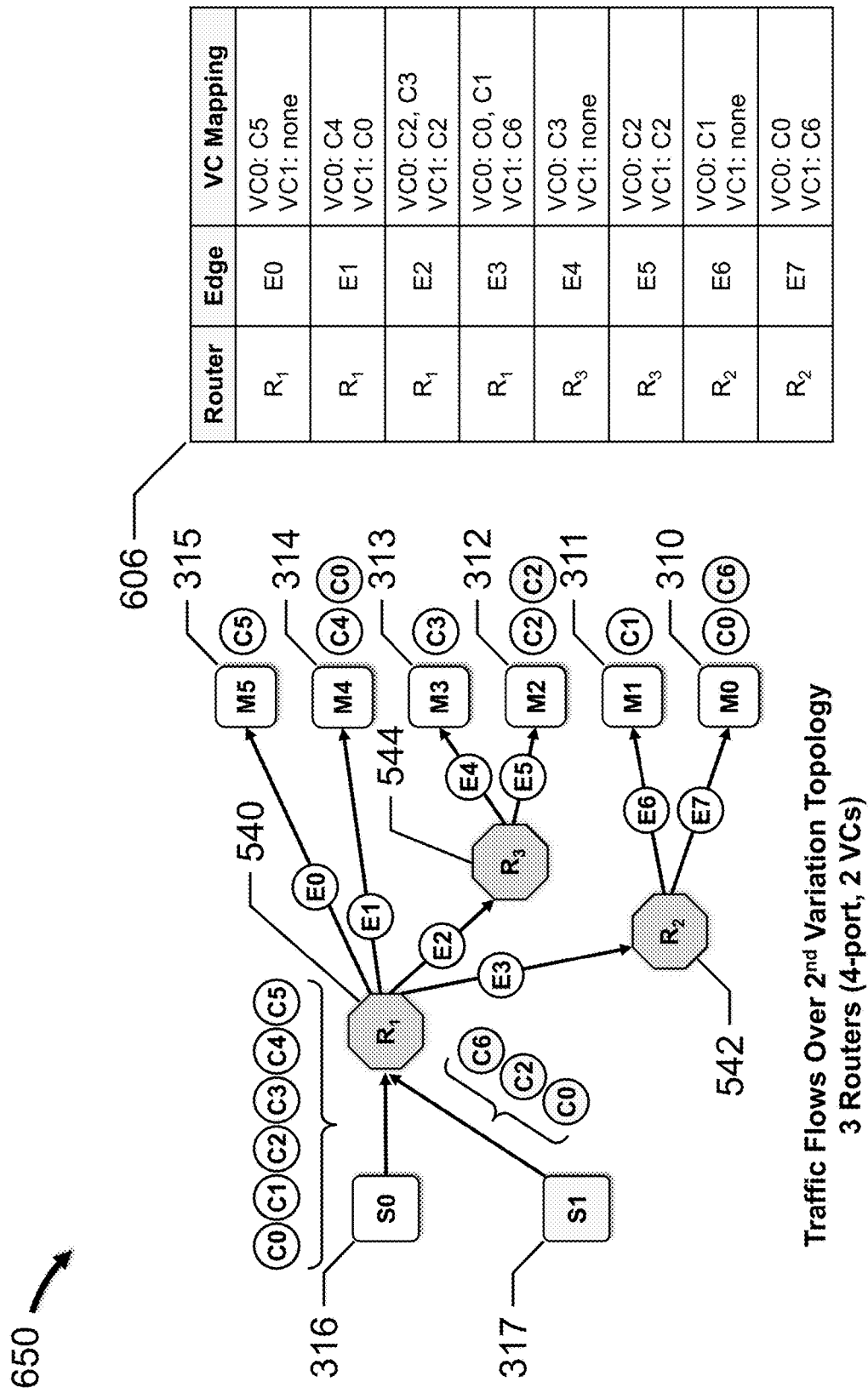
FIG. 10B depicts a traffic flow view of the traffic flows over a second variation topology of a NoC, in accordance with an embodiment of the present disclosure.

FIG. 10B depicts traffic flow view 650 of the traffic flows over a second variation topology of NoC 300, in accordance with an embodiment of the present disclosure.

After additional iterations of the k-way minimum cost partitioning process, a second variation of the baseline topology 507 may be generated. In this variation, router 544 has been added to the baseline topology 507, which has the same number of ports, supports the same number of VCs, and has the same available {edge, VC} combinations as routers 540 and 542. A TCAG may be generated for router 544, which is a subset of TCAG 620 that includes traffic classes C2 and C3.

Router 540 receives all of the traffic classes from device 316, i.e., traffic classes C0, C1, C2, C3, C4 and C5, and all of the traffic classes from device 317, i.e., traffic classes C0, C2 and C6. Additionally, router 540 is now coupled to devices 314 and 315, router 542 and router 544, router 542 is now coupled to devices 310 and 311, and router 544 is coupled to devices 312 and 313. The {edge, VC} combination and VC mappings for routers 540, 542 and 544 are provided in mapping table 606. Router 540 has 4 edges, i.e., edges E0, E1, E2 and E3, and two VCs per edge, i.e., VC0 and VC1, router 542 has 2 edges, i.e., edges E6 and E7, and two VCs per edge, i.e., VC0 and VC1, and router 544 has 2 edges, i.e., edges E4 and E5, and two VCs per edge, i.e., VC0 and VC1.

Two VCs carry more than one traffic class, i.e., VC0 of edge E2, and VC0 of edge E3; the remaining VCs carry one or zero (i.e., none) traffic classes. The combination of traffic classes for VC0 of edge E2, i.e., traffic classes C2 and C3, was determined based on TCAG 620 for router 540, which depicts an edge weight of 3.5 between traffic classes C2 and C3, which indicates a high affinity between C2 and C3 due, at least in part, to the LS traffic and different bandwidths. The combination of traffic classes for VC0 of edge E3, i.e., traffic classes C0 and C1, was determined based on TCAG 620 for router 540, which depicts an edge weight of 3.5 between traffic classes C0 and C1, which indicates a high affinity between C0 and C1 due, at least in part, to the non-LS traffic class and different bandwidths.

For router 540, traffic class C5 is output over edge E0 and VC0 to device 315. Traffic class C4 is output over edge E1 and VC0 to device 314, and traffic class C0 is output over edge E1 and VC1 to device 314. Traffic classes C2 and C3 are output over edge E2 and VC0 to router 544, and traffic class C2 is output over edge E2 and VC1 to router 544. Traffic classes C0 and C1 are output over edge E3 and VC0 to router 542, and traffic class C6 is output over edge E3 and VC1 to router 542.

For router 542, traffic class C1 is output over edge E6 and VC0 to device 311. Traffic class C0 is output over edge E7 and VC0 to device 310, and traffic class C6 is output over edge E7 and VC1 to device 310.

For router 544, traffic class C3 is output over edge E4 and VC0 to device 313. Traffic class C2 is output over edge E5 and VC0 to device 312, and traffic class C2 is output over edge E5 and VC1 to device 312.

In certain embodiments, the {edge, VC} and traffic combinations provided in mapping table 606 are the final {4 edge, 2 VC} combination and traffic combinations for router 540, and the final {2 edge, 2 VC} combination and traffic combinations for routers 542 and 544. All of these final EVC combinations are available {edge, VC} combinations for these routers, as described above. In this embodiment, traffic classes C2 and C3 output over edge E2 and VC0 were combined, and traffic classes C0 and C1 output over edge E3 and VC0 were combined. In other embodiments, further iterations of the k-way minimum cost partitioning process may be performed to refine the final {edge, VC} combinations and traffic class combinations.

Figure 10C:
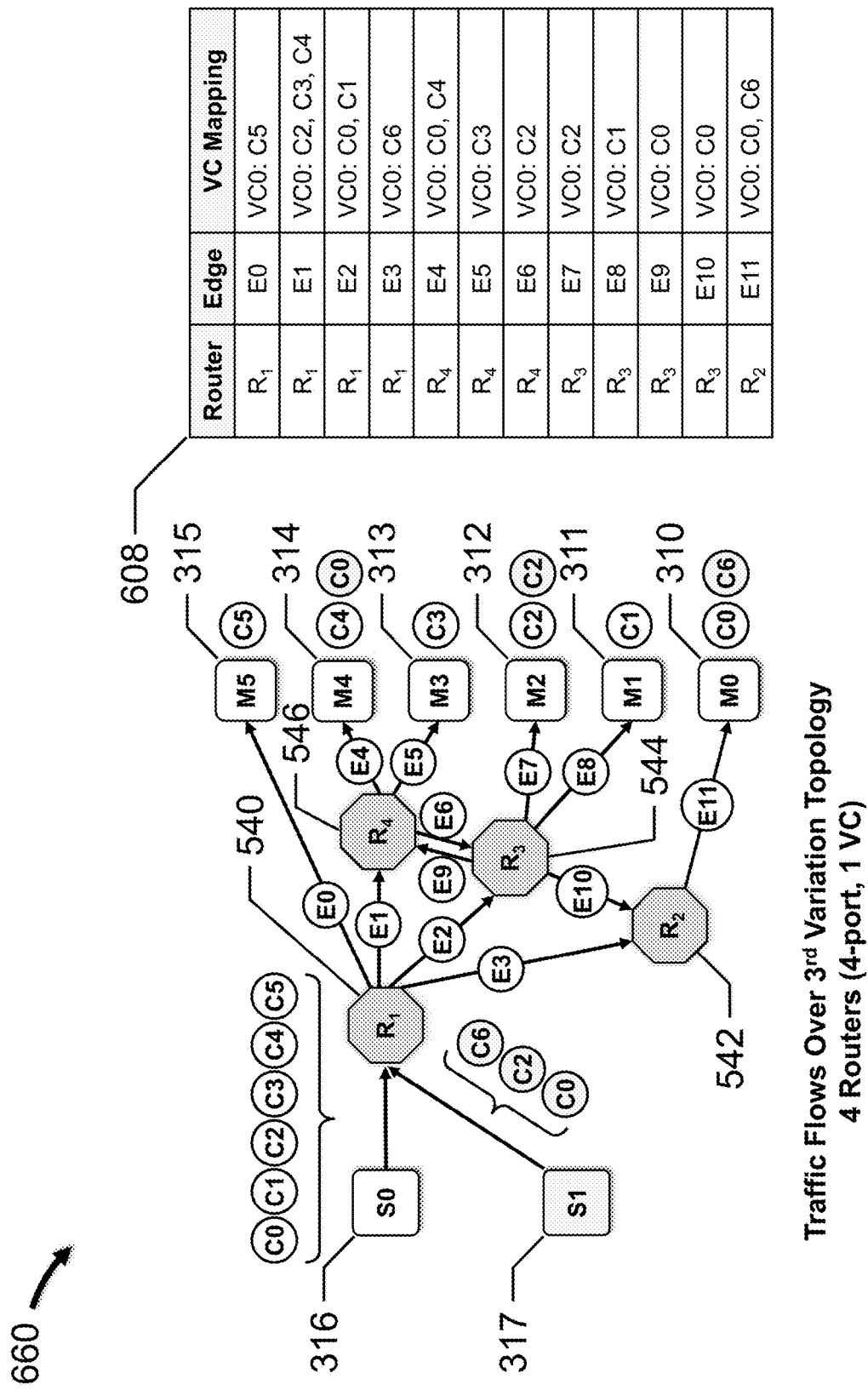
FIG. 10C depicts a traffic flow view of the traffic flows over a third variation topology of a NoC, in accordance with an embodiment of the present disclosure.

FIG. 10C depicts traffic flow view 660 of the traffic flows over a third variation topology of NoC 300, in accordance with an embodiment of the present disclosure.

After additional iterations of the k-way minimum cost partitioning process, a third variation of the baseline topology 507 may be generated. In this variation, router 546 has been added to the second variation of the baseline topology 507, which has the same number of ports, supports the same number of VCs, and has the same available {edge, VC} combinations as routers 540, 542 and 544. A TCAG may be generated for router 544, which is a subset of TCAG 620 that includes traffic classes C0, C1 and C2. Similarly, a TCAG may be generated for router 546, which is a subset of TCAG 620 that includes traffic classes C0, C2, C3 and C4.

Router 540 receives all of the traffic classes from device 316, i.e., traffic classes C0, C1, C2, C3, C4 and C5, and all of the traffic classes from device 317, i.e., traffic classes C0, C2 and C6. Additionally, router 540 is now coupled to device 315 and routers 542, 544 and 546, router 542 is now coupled to device 310, router 544 is coupled to devices 311 and 312 and routers 542 and 546, and router 546 is coupled to devices 313 and 314 and router 544.

The {edge, VC} combinations for routers 540, 542, 544 and 546 are provided in mapping table 606. Only a single VC, i.e., VC0, is needed for all of the {edge, VC} combinations for routers 540, 542, 544 and 546 in this variation. Router 540 has 4 edges, i.e., edges E0, E1, E2 and E3, router 542 has 1 edge, i.e., edge E11, router 544 has 4 edges, i.e., edges E7, E8, E9 and E10, and router 546 has 3 edges, i.e., edges E4, E5 and E6.

Four edges carry more than one traffic class, i.e., edges E1, E2, E4 and E11; the remaining edges carry one traffic class.

The combination of traffic classes for VC0 of edge E1, i.e., traffic classes C2, C3 and C4, was determined based on TCAG 620 for router 540, which depicts an edge weight of 3.5 between traffic classes C2 and C3, an edge weight of 3 between traffic classes C2 and C4, and an edge weight of 3 between traffic classes C3 and C4. The edge weights indicate a high affinity between traffic classes C2 and C3 due, at least in part, to the LS traffic class and different bandwidths, and a medium affinity between traffic classes C4 and C2, C3 due, at least in part, to the LS traffic class and different bandwidths.

The combination of traffic classes for edge E2, i.e., traffic classes C0 and C1, was determined based on TCAG 620 for router 540, which depicts an edge weight of 3.5 between traffic classes C0 and C1, which indicates a high affinity between traffic classes C0 and C1 due, at least in part, to the non-LS traffic class and different bandwidths.

The combination of traffic classes for edge E4, i.e., traffic classes C0 and C4, was determined based on TCAG 620 for router 540, which depicts an edge weight of 3 between traffic classes C0 and C4, which indicates a medium affinity between traffic classes C0 and C4 due, at least in part, to the non-LS and LS traffic and different bandwidths.

The combination of traffic classes for edge E11, i.e., traffic classes C0 and C6, was determined based on TCAG 630 for router 542, which depicts an edge weight of 3 between traffic classes C0 and C6, which indicates a medium affinity between traffic classes C0 and C6 due, at least in part, to the general affinity of traffic class C0.

For router 540, traffic class C5 is output over edge E0 and VC0 to device 315. Traffic classes C2, C3 and C4 are output over edge E1 and VC0 to router 546. Traffic classes C0 and C1 are output over edge E2 and VC0 to router 544. Traffic class C6 is output over edge E3 and VC0 to router 542.

For router 542, traffic classes C0 and C6 are output over edge E11 and VC0 to device 310.

For router 544, traffic class C2 is output over edge E7 and VC0 to device 312. Traffic class C1 is output over edge E8 and VC0 to device 311. Traffic class C0 is output over edge E9 and VC0 to router 546. Traffic class C0 is output over edge E10 and VC0 to router 542.

For router 546, traffic classes C0 and C4 are output over edge E4 and VC0 to device 314. Traffic class C3 is output over edge E5 and VC0 to device 313. Traffic class C2 is output over edge E6 and VC0 to router 544.

The appropriate traffic classes are then merged to satisfy each router's available {edge, VC} combinations. For example, traffic classes C0 and C4 transmitted over edge E4 and VC0 may be merged into a single traffic superclass, traffic classes C0 and C6 transmitted over edge E11 and VC0 may be merged into a traffic superclass, etc.

A final {edge, VC} combination for each identified router is then determined based on the merged traffic classes.

Router 540 has a final EVC combination of {4 edges, 1 VC}, router 542 has a final EVC combination of {1 edge, 1 VC}, router 544 has a final EVC combination of {3 edges, 1 VC}, and router 546 has a final EVC combination of {3 edges, 1 VC}. All of these final EVC combinations are available {edge, VC} combinations for these routers, as described above.

Generally, the process of combining the traffic classes on routers that process more traffic classes than {edge, VC} combinations may be performed at various stages in the flow. In the embodiments described above, the functionality flows from 235 to 236 to 237 (solid flow arrows), i.e., at 236, the routers are merged and the baseline topology is generated, and, at 237, the process of combining the traffic classes is performed to generate the final topology. In other embodiments, the functionality flows from 235 to 237 to 236 (dotted flow arrows), i.e., at 237, the process of combining the traffic classes may be performed to generate the baseline topology, and, at 236, the routers may be merged and the final topology may be generated.

Figure 11:
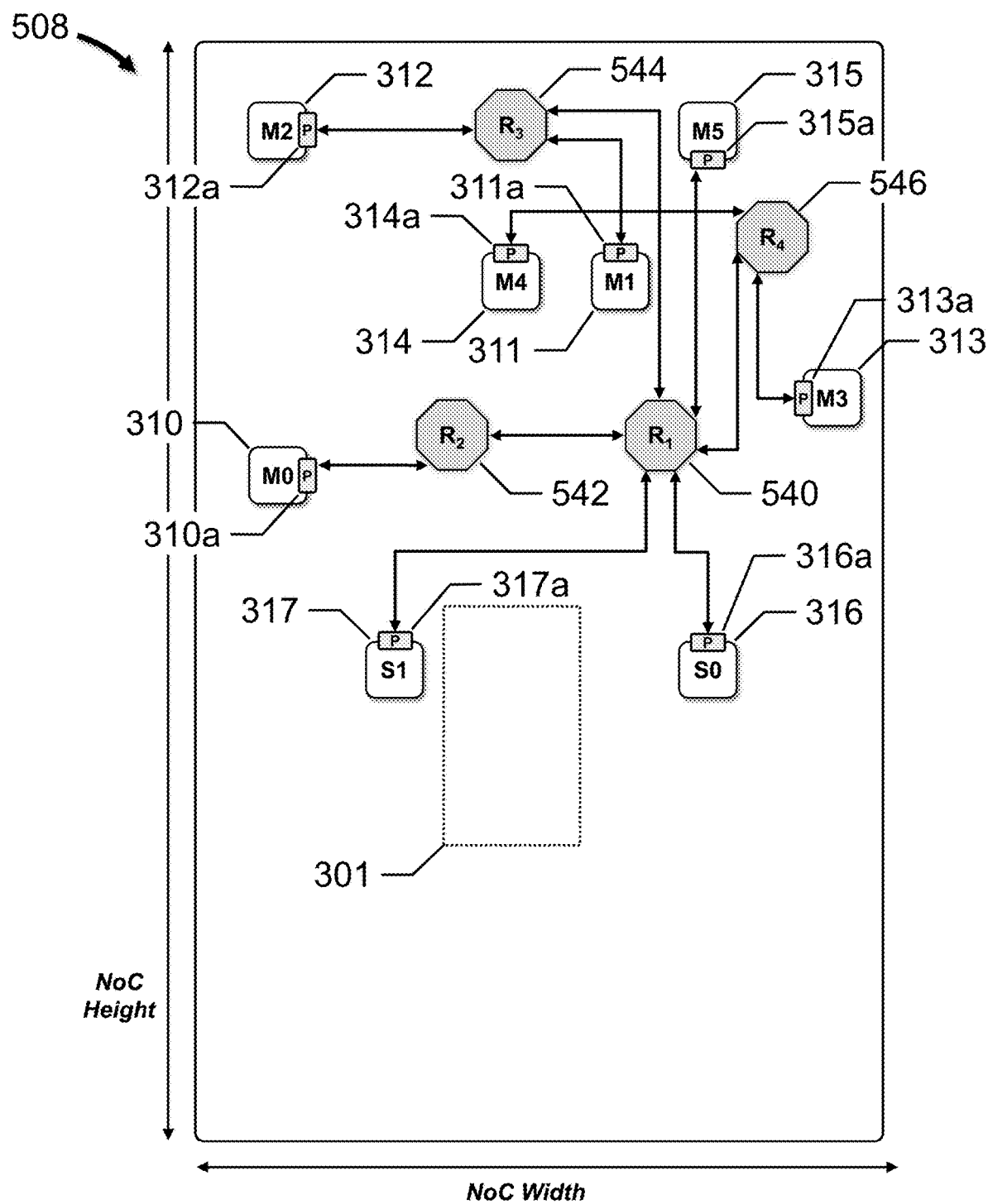
FIG. 11 depicts a final topology for a NoC, in accordance with an embodiment of the present disclosure.

FIG. 11 depicts final topology 508 for NoC 300, in accordance with an embodiment of the present disclosure. A user may view final topology 508 on display 152.

After the final {edge, VC} combination for each identified router has been determined, final topology 508 is determined based, at least in part, on the merged traffic classes and the final {edge, VC} combinations for the identified routers. Final topology 508 has the same NoC height and width as NoC 300, and includes unrouteable area 301 located within a central portion of final topology 508. Device 310 is connected to router 542 through bridge port 310a. Device 311 is connected to router 544 through bridge port 311a. Device 312 is connected to router 544 through bridge port 312a. Device 313 is connected to router 546 through bridge port 313a. Device 314 is connected to router 546 through bridge port 314a. Device 315 is connected to router 540 through bridge port 315a. Device 316 is connected to router 540 through bridge port 316a. Device 317 is connected to router 540 through bridge port 317a.

In certain embodiments, clock domains may be determined and assigned based on traffic flows and topology.

Referring back to FIG. 2, at 240, a route for each traffic flow is determined. In one embodiment, shortest path routing is used, with optional constraints to disallow cycles in the generated topology. Different routing methodologies may be employed, such as, for example, XY-YX routing, turn prohibition routing, etc.

At 250, a configuration network is generated. In many embodiments, the configuration network may be used for debugging purposes. The configuration network includes the bridge ports, the routers, the connections and the routes. In one embodiment, the configuration network mimics the data-network. Additionally, the configuration network may be independently optimized in a manner similar to the data-network. The latency and performance of the configuration network are typically relaxed in order to produce the simplest design with the lowest area.

At 260, a PCDC buffer is added to a connection between a bridge or router in a synchronous clock domain and an adjacent bridge or router in an asynchronous clock domain, and clock domains assignments may be refined.

At 270, a link size is determined for each router in each route, and a resizer is added between a bridge and a router with different link sizes or between adjacent routers with different link sizes. Generally, link sizes are determined using bridge data, traffic data, VC assignments and topology in order to collectively meet average traffic performance requirements and to individually meet peak traffic performance requirements. Additionally, the number of resizers added to the NoC is minimized in order to reduce the latency encountered by the traffic flows. In certain embodiments, certain bridge ports may be allowed to peak concurrently.

At 280, pipeline and retiming components are added based on timing. In order to meeting timing, pipeline components are added at appropriate locations to keep the slack (i.e., the difference between a required time and an arrival time) within appropriate limits. For example, one or more components may be relocated, and, if the relocated components are not able to meet timing, then one or more pipeline components may be added. For example, component relocation may be based on force-directed placement, etc.

At 290, NoC output specification 292 is generated, and then stored in memory 130. Additionally, NoC output specification 292 may be transmitted over network 20, provided to software modules 136 used by the NoC designer, etc. For example, NoC output specification 292 may be provided as input to a NoC fabrication process in a chip foundry. Reports 294 may also be generated, and then stored in memory 130. For example, reports 294 may contain the components used in the design (e.g., routers, resizers, PCDCs, pipelines, etc.), the traffic on each link, the link utilization, latencies across a path, etc.

Figure 12A:
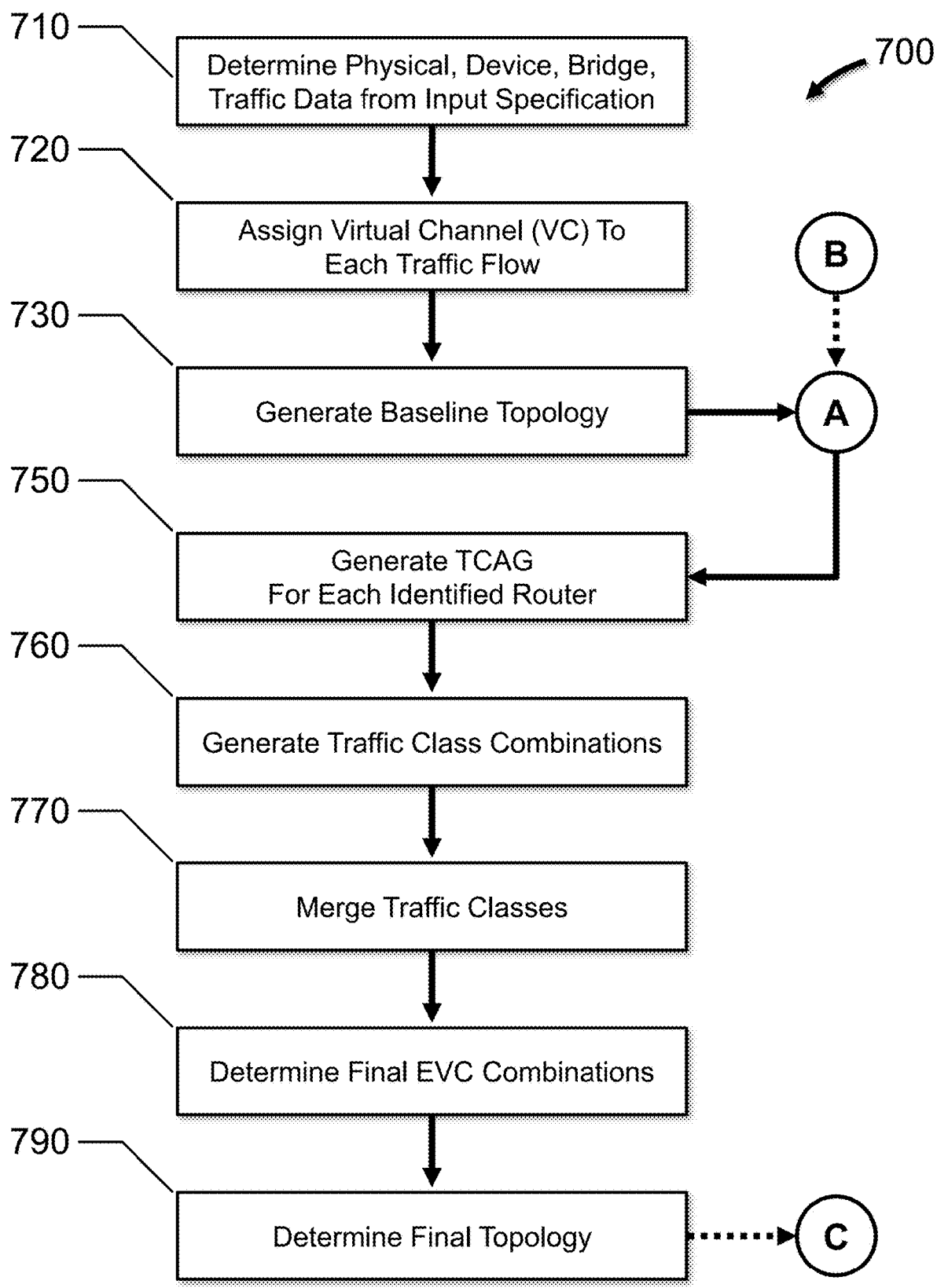
FIGS. 12A, 12B, 12C and 12D depict flow diagrams representing functionality associated with synthesizing a NoC, in accordance with embodiments of the present disclosure.
Figure 12B:
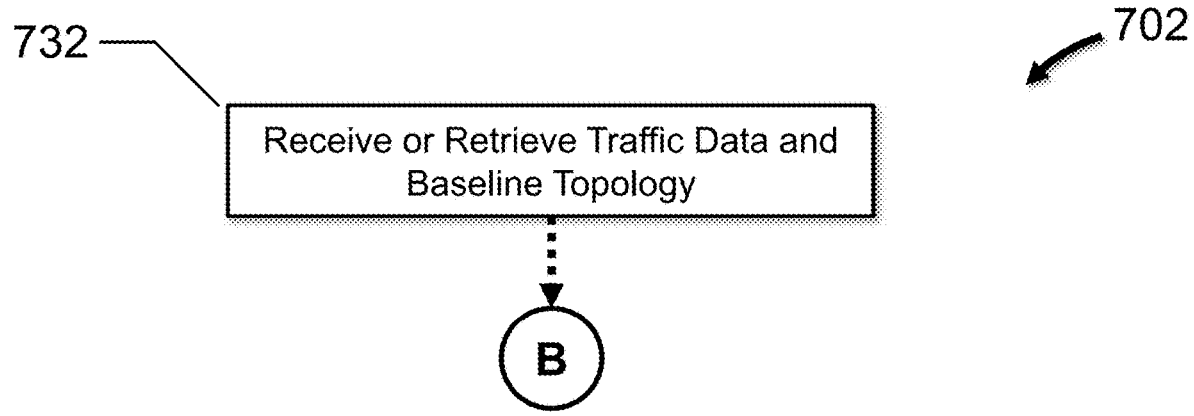
Figure 12C:
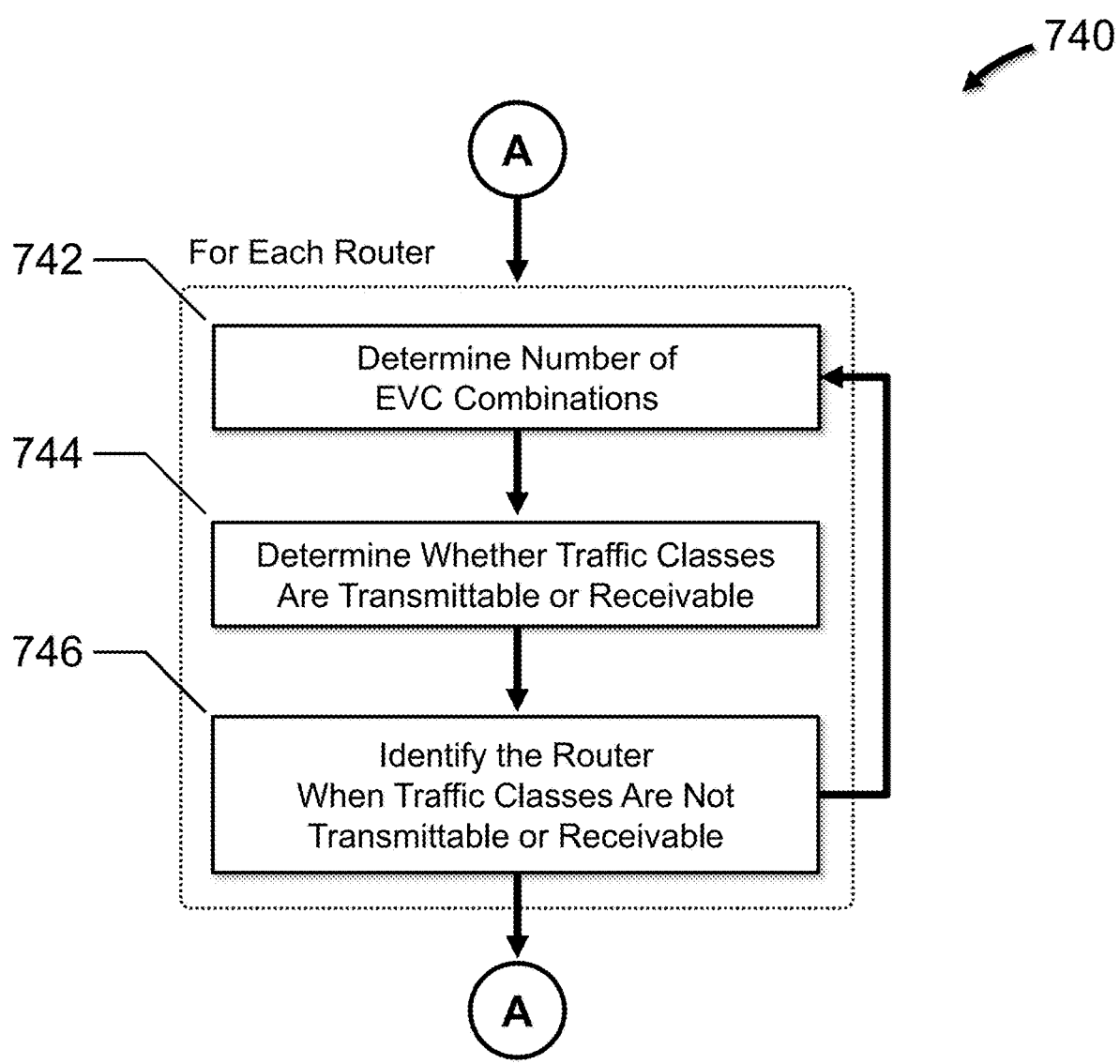
Figure 12D:
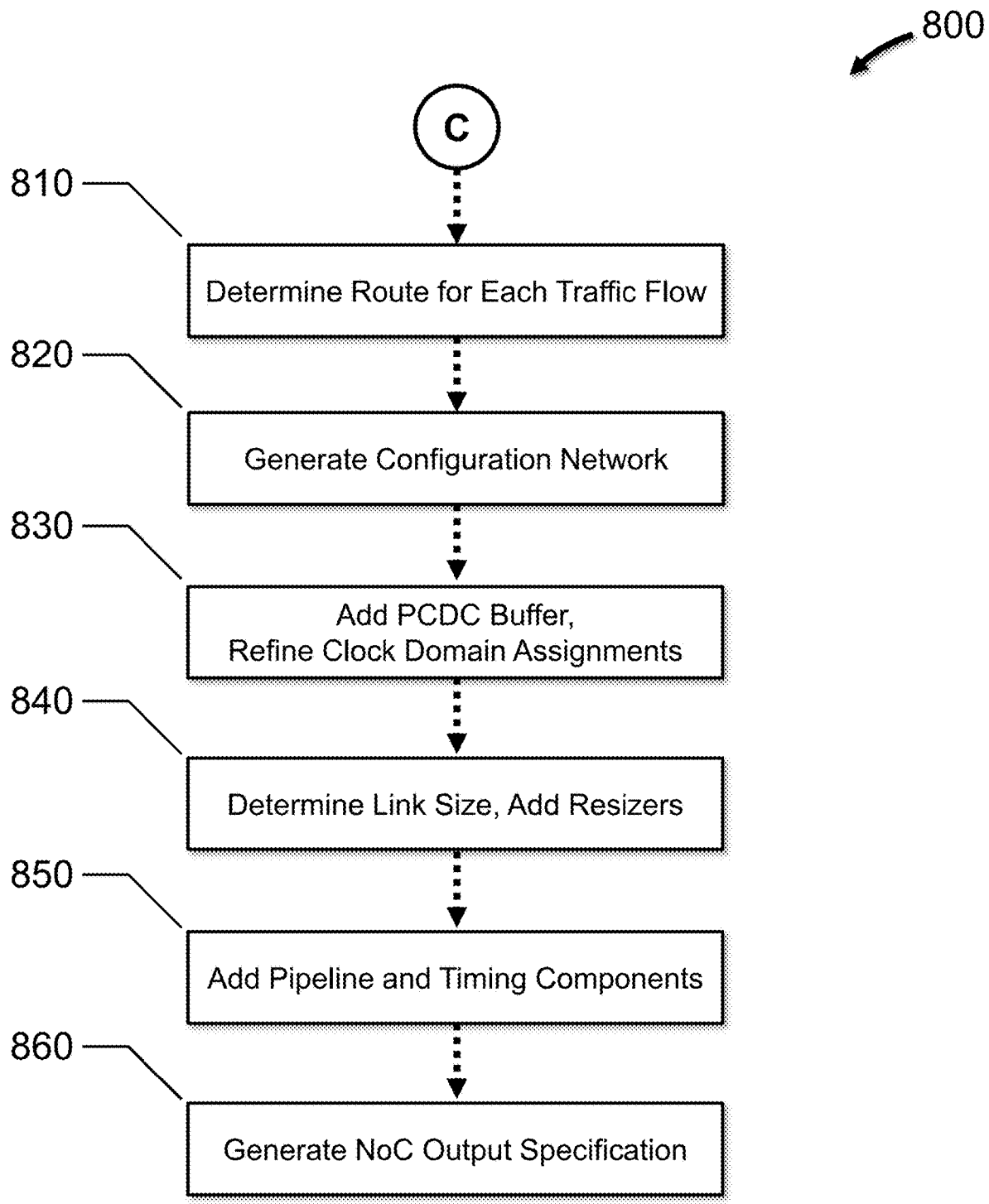

FIGS. 12A, 12B, 12C and 12D depict flow diagrams representing functionality associated with synthesizing a NoC, in accordance with embodiments of the present disclosure. FIG. 12A depicts flow diagram 700, FIG. 12B depicts flow diagram 702, FIG. 12C depicts flow diagram 740, and FIG. 12D depicts flow diagram 800; dotted connections indicate optional elements.

At 710, physical data, device data, bridge data and traffic data are determined based on an input specification for the NoC. The physical data include dimensions for the NoC. The device data include a plurality of devices, and each device has a location and dimensions. The bridge data include a plurality of bridge ports, and each bridge port is associated with one of the devices, and each bridge port has a location. The traffic data includes a plurality of traffic flows, and each traffic flow includes one or more traffic classes.

At 720, a VC is assigned to each traffic flow to create a plurality of VC assignments.

At 730, a baseline topology is generated based on the physical data, the device data, the bridge data, the traffic data and the VC assignments. The baseline topology includes the plurality of bridge ports, a plurality of routers and a plurality of connections. Each router includes a number of ports, and is configured to process a plurality of traffic classes and to support a maximum number of VCs.

In other embodiments, the functionality at 710, 720 and 730 is not executed. Instead, at 732, traffic data and the baseline topology are received by computer 100, or, alternatively, retrieved from memory 130.

The functionality at 742, 744 and 746 is then performed for each router.

At 742, a number of EVC combinations is determined. Each EVC combination includes a number of available edges and a number of available VCs, and each available edge corresponds to a different port.

At 744, a determination of whether the traffic classes are transmittable or receivable by at least one EVC combination is made.

At 746, the router is identified when the traffic classes are determined not transmittable or receivable.

At 750, a TCAG is generated for each identified router.

At 760, traffic class combinations are generated for the identified routers based on the TCAGs and the EVC combinations.

At 770, traffic classes of the identified routers are merged based on the traffic class combinations.

At 780, a final EVC combination is determined for each identified router based on the merged traffic classes.

At 790, a final topology is generated based, at least in part, on the merged traffic classes and the final EVC combinations for the identified routers.

At 810, a route for each traffic flow is determined. In certain embodiments, clock domains may be determined and assigned based on traffic flows and topology.

At 820, a configuration network is generated.

At 830, a PCDC buffer is added to a connection between a bridge or router in a synchronous clock domain and an adjacent bridge or router in an asynchronous clock domain, and clock domains assignments may be refined.

At 840, a link size is determined for each router in each route, and a resizer is added between a bridge and a router with different link sizes or between adjacent routers with different link sizes.

At 850, pipeline and retiming components are added based on timing.

At 860, a NoC output specification is generated.

Embodiments of the present disclosure advantageously provide a computer-based method and system for synthesizing a Network-on-Chip (NoC). The embodiments described above and summarized below are combinable.

In one embodiment, a computer-based method for synthesizing a Network-on-Chip (NoC) includes determining physical data, device data, bridge data and traffic data based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, each traffic flow including one or more traffic classes; assigning a virtual channel (VC) to each traffic flow to create a plurality of VC assignments; generating a baseline topology based on the physical data, the device data, the bridge data, the traffic data and the VC assignments, the baseline topology including the plurality of bridge ports, a plurality of routers and a plurality of connections, each router including a number of ports, each router configured to process a plurality of traffic classes and to support a maximum number of VCs; for each router, determining a number of edge virtual channel (EVC) combinations, each EVC combination including a number of available edges and a number of available VCs, each available edge corresponding to a different port, determining whether the traffic classes are transmittable or receivable by at least one EVC combination, and when the traffic classes are determined not transmittable or receivable, identifying the router; generating a traffic class affinity graph (TCAG) for each identified router; generating traffic class combinations for the identified routers based on the TCAGs and the EVC combinations; merging traffic classes of the identified routers based on the traffic class combinations; determining a final EVC combination for each identified router based on the merged traffic classes; and generating a final topology based, at least in part, on the merged traffic classes and the final EVC combinations for the identified routers.

In another embodiment of the method, for each router, the number of available edges is equal to or less than the number of ports; and the number of available VCs is equal to or less than the maximum number of VCs.

In another embodiment of the method, the traffic class combinations are generated by k-way minimum cost partitioning for each identified router, where k is the number of EVC combinations for the identified router.

In another embodiment of the method, said generating traffic class combinations includes adding one or more routers to the baseline topology, each added router configured to process one or more traffic classes of the identified routers; determining a number of EVC combinations for each added router; generating a TCAG for each added router; and identifying each added router.

In another embodiment of the method, the TCAG for each identified router includes a plurality of nodes, each node associated with a different traffic class processed by the identified router; and a plurality of edges, each edge connecting a different pair of nodes, each edge having a weight that indicates a degree to which the traffic classes of the respective nodes are combinable.

In another embodiment of the method, each edge weight is a traffic-class affinity metric that is determined based on one or more affinity characteristics of the traffic classes of the respective nodes.

In another embodiment of the method, the affinity characteristics include at least one of a latency sensitivity (LS), a watermark, a packet rate and a burst length; and each traffic class includes at least one of an LS value, a watermark value, a packet rate value, and a burst length value.

In another embodiment of the method, the traffic-class affinity metric includes at least one of a comparison of the LS values of the respective nodes, a comparison of the watermark values of the respective nodes, an evaluation of the packet rate values of the respective nodes, and an evaluation of the burst length values of the respective nodes.

In another embodiment of the method, the traffic-class affinity metric is an integer value that includes a plurality of bit fields, each bit field including one or more bits corresponding to a different affinity characteristic.

In another embodiment of the method, said generating the baseline topology includes constructing a head of line (HoL) conflict graph (HCG) based on the traffic data and the VC assignments, including creating a plurality of nodes, each node representing a traffic flow, creating a plurality of edges, each edge representing an HoL conflict, and assigning a color to each HCG node to minimize HoL conflicts; constructing a plurality of traffic graphs (TGs) based on the physical data, the bridge data, the traffic data and the HCG, including constructing a TG for each color of the HCG; generating a candidate topology for each TG, each candidate topology including at least two bridge ports, at least one router and at least two connections; merging the candidate topologies to create the baseline topology; and merging routers within the baseline topology.

In one embodiment, a system for synthesizing a Network-on-Chip (NoC) includes a memory to store an input specification for a NoC, and a processor coupled to the memory. The processor is configured to determine physical data, device data, bridge data and traffic data based on the input specification, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, each traffic flow including one or more traffic classes; assign a virtual channel (VC) to each traffic flow to create a plurality of VC assignments; generate a baseline topology based on the physical data, the device data, the bridge data, the traffic data and the VC assignments, the baseline topology including the plurality of bridge ports, a plurality of routers and a plurality of connections, each router including a number of ports, each router configured to process a plurality of traffic classes and to support a maximum number of VCs; for each router, determine a number of edge virtual channel (EVC) combinations, each EVC combination including a number of available edges and a number of available VCs, each available edge corresponding to a different port, determine whether the traffic classes are transmittable or receivable by at least one EVC combination, and when the traffic classes are determined not transmittable or receivable, identify the router; generate a traffic class affinity graph (TCAG) for each identified router; generate traffic class combinations for the identified routers based on the TCAGs and the EVC combinations; merge traffic classes of the identified routers based on the traffic class combinations; determine a final EVC combination for each identified router based on the merged traffic classes; and generate a final topology based, at least in part, on the merged traffic classes and the final EVC combinations for the identified routers.

In another embodiment of the system, for each router, the number of available edges is equal to or less than the number of ports, and the number of available VCs is equal to or less than the maximum number of VCs; and the traffic class combinations are generated by k-way minimum cost partitioning for each identified router, where k is the number of EVC combinations for the identified router.

In another embodiment of the system, said generate traffic class combinations includes add one or more routers to the baseline topology, each added router configured to process one or more traffic classes of the identified routers; determine a number of EVC combinations for each added router; generate a TCAG for each added router; and identify each added router.

In another embodiment of the system, the TCAG for each identified router includes a plurality of nodes, each node associated with a different traffic class processed by the identified router; and a plurality of edges, each edge connecting a different pair of nodes, each edge having a weight that indicates a degree to which the traffic classes of the respective nodes are combinable, where each edge weight is a traffic-class affinity metric that is determined based on one or more affinity characteristics of the traffic classes of the respective nodes.

In another embodiment of the system, the affinity characteristics include at least one of a latency sensitivity (LS), a watermark, a packet rate and a burst length; each traffic class includes at least one of an LS value, a watermark value, a packet rate value, and a burst length value; and the traffic-class affinity metric includes at least one of a comparison of the LS values of the respective nodes, a comparison of the watermark values of the respective nodes, an evaluation of the packet rate values of the respective nodes, and an evaluation of the burst length values of the respective nodes.

In one embodiment, a further method for synthesizing a Network-on-Chip (NoC), includes receiving traffic data and a baseline topology, the traffic data including a plurality of traffic flows, each traffic flow including one or more traffic classes, the baseline topology including a plurality of bridge ports, a plurality of routers and a plurality of connections, each router including a number of ports, each router configured to process a plurality of traffic classes and to support a maximum number of virtual channels (VCs); for each router, determining a number of edge virtual channel (EVC) combinations, each EVC combination including a number of available edges and a number of available VCs, each available edge corresponding to a different port, determining whether the traffic classes are transmittable or receivable by at least one EVC combination, and when the traffic classes are determined not transmittable or receivable, identifying the router; generating a traffic class affinity graph (TCAG) for each identified router; generating traffic class combinations for the identified routers based on the TCAGs and the EVC combinations; merging traffic classes of the identified routers based on the traffic class combinations; determining a final EVC combination for each identified router based on the merged traffic classes; and generating a final topology based, at least in part, on the merged traffic classes and the final EVC combinations for the identified routers.

In another embodiment of the further method, for each router, the number of available edges is equal to or less than the number of ports, and the number of available VCs is equal to or less than the maximum number of VCs; and the traffic class combinations are generated by k-way minimum cost partitioning for each identified router, where k is the number of EVC combinations for the identified router.

In another embodiment of the further method, said generating traffic class combinations includes adding one or more routers to the baseline topology, each added router configured to process one or more traffic classes of the identified routers; determining a number of EVC combinations for each added router; generating a TCAG for each added router; and identifying each added router.

In another embodiment of the further method, the TCAG for each identified router includes a plurality of nodes, each node associated with a different traffic class processed by the identified router; and a plurality of edges, each edge connecting a different pair of nodes, each edge having a weight that indicates a degree to which the traffic classes of the respective nodes are combinable, where each edge weight is a traffic-class affinity metric that is determined based on one or more affinity characteristics of the traffic classes of the respective nodes.

In another embodiment of the further method, the affinity characteristics include at least one of a latency sensitivity (LS), a watermark, a packet rate and a burst length; each traffic class includes at least one of an LS value, a watermark value, a packet rate value, and a burst length value; and the traffic-class affinity metric includes at least one of a comparison of the LS values of the respective nodes, a comparison of the watermark values of the respective nodes, an evaluation of the packet rate values of the respective nodes, and an evaluation of the burst length values of the respective nodes.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for synthesizing a Network-on-Chip (NoC), comprising:
    determining physical data, device data, bridge data and traffic data based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, each traffic flow including one or more traffic classes;
    assigning a virtual channel (VC) to each traffic flow to create a plurality of VC assignments;
    generating a baseline topology based on the physical data, the device data, the bridge data, the traffic data and the VC assignments, the baseline topology including the plurality of bridge ports, a plurality of routers and a plurality of connections, each router including a number of ports, each router configured to process a plurality of traffic classes and to support a maximum number of VCs;
    for each router:
        determining a number of edge virtual channel (EVC) combinations, each EVC combination including a number of available edges and a number of available VCs, each available edge corresponding to a different port,
        determining whether the traffic classes are transmittable or receivable by at least one EVC combination, and
        when the traffic classes are determined not transmittable or receivable, identifying the router;
    generating a traffic class affinity graph (TCAG) for each identified router;
    generating traffic class combinations for the identified routers based on the TCAGs and the EVC combinations;
    merging traffic classes of the identified routers based on the traffic class combinations;
    determining a final EVC combination for each identified router based on the merged traffic classes; and
    generating a final topology based, at least in part, on the merged traffic classes and the final EVC combinations for the identified routers.

2. The computer-based method according to claim 1, where, for each router:
    the number of available edges is equal to or less than the number of ports; and
    the number of available VCs is equal to or less than the maximum number of VCs.

3. The computer-based method according to claim 2, where the traffic class combinations are generated by k-way minimum cost partitioning for each identified router, where k is the number of EVC combinations for the identified router.

4. The computer-based method according to claim 3, where said generating traffic class combinations includes:
    adding one or more routers to the baseline topology, each added router configured to process one or more traffic classes of the identified routers;
    determining a number of EVC combinations for each added router;
    generating a TCAG for each added router; and
    identifying each added router.

5. The computer-based method according to claim 1, where the TCAG for each identified router includes:
    a plurality of nodes, each node associated with a different traffic class processed by the identified router; and
    a plurality of edges, each edge connecting a different pair of nodes, each edge having a weight that indicates a degree to which the traffic classes of the respective nodes are combinable.

6. The computer-based method according to claim 5, where each edge weight is a traffic-class affinity metric that is determined based on one or more affinity characteristics of the traffic classes of the respective nodes.

7. The computer-based method according to claim 6, where:
    the affinity characteristics include at least one of a latency sensitivity (LS), a watermark, a packet rate and a burst length; and
    each traffic class includes at least one of an LS value, a watermark value, a packet rate value, and a burst length value.

8. The computer-based method according to claim 7, where the traffic-class affinity metric includes at least one of a comparison of the LS values of the respective nodes, a comparison of the watermark values of the respective nodes, an evaluation of the packet rate values of the respective nodes, and an evaluation of the burst length values of the respective nodes.

9. The computer-based method according to claim 8, where the traffic-class affinity metric is an integer value that includes a plurality of bit fields, each bit field including one or more bits corresponding to a different affinity characteristic.

10. The computer-based method according to claim 1, where said generating the baseline topology includes:
    constructing a head of line (HoL) conflict graph (HCG) based on the traffic data and the VC assignments, including:
        creating a plurality of nodes, each node representing a traffic flow,
        creating a plurality of edges, each edge representing an HoL conflict, and
        assigning a color to each HCG node to minimize HoL conflicts;
    constructing a plurality of traffic graphs (TGs) based on the physical data, the bridge data, the traffic data and the HCG, including constructing a TG for each color of the HCG;
    generating a candidate topology for each TG, each candidate topology including at least two bridge ports, at least one router and at least two connections;
    merging the candidate topologies to create the baseline topology; and
    merging routers within the baseline topology.

11. A system for synthesizing a Network-on-Chip (NoC), comprising:

a memory to store an input specification for a NoC; and
a processor, coupled to the memory, configured to:
  determine physical data, device data, bridge data and traffic data based on the input specification, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, each traffic flow including one or more traffic classes,
  assign a virtual channel (VC) to each traffic flow to create a plurality of VC assignments,
  generate a baseline topology based on the physical data, the device data, the bridge data, the traffic data and the VC assignments, the baseline topology including the plurality of bridge ports, a plurality of routers and a plurality of connections, each router including a number of ports, each router configured to process a plurality of traffic classes and to support a maximum number of VCs,
  for each router:
    determine a number of edge virtual channel (EVC) combinations, each EVC combination including a number of available edges and a number of available VCs, each available edge corresponding to a different port,
    determine whether the traffic classes are transmittable or receivable by at least one EVC combination, and
    when the traffic classes are determined not transmittable or receivable, identify the router,
  generate a traffic class affinity graph (TCAG) for each identified router,
  generate traffic class combinations for the identified routers based on the TCAGs and the EVC combinations,
  merge traffic classes of the identified routers based on the traffic class combinations,
  determine a final EVC combination for each identified router based on the merged traffic classes, and
  generate a final topology based, at least in part, on the merged traffic classes and the final EVC combinations for the identified routers.

12. The system according to claim 11, where:
for each router, the number of available edges is equal to or less than the number of ports, and the number of available VCs is equal to or less than the maximum number of VCs; and
the traffic class combinations are generated by k-way minimum cost partitioning for each identified router, where k is the number of EVC combinations for the identified router.

13. The system according to claim 12, where said generate traffic class combinations includes:
add one or more routers to the baseline topology, each added router configured to process one or more traffic classes of the identified routers;
determine a number of EVC combinations for each added router;
generate a TCAG for each added router; and
identify each added router.

14. The system according to claim 11, where the TCAG for each identified router includes:
a plurality of nodes, each node associated with a different traffic class processed by the identified router; and
a plurality of edges, each edge connecting a different pair of nodes, each edge having a weight that indicates a degree to which the traffic classes of the respective nodes are combinable,
where each edge weight is a traffic-class affinity metric that is determined based on one or more affinity characteristics of the traffic classes of the respective nodes.

15. The system according to claim 14, where:
the affinity characteristics include at least one of a latency sensitivity (LS), a watermark, a packet rate and a burst length;
each traffic class includes at least one of an LS value, a watermark value, a packet rate value, and a burst length value; and
the traffic-class affinity metric includes at least one of a comparison of the LS values of the respective nodes, a comparison of the watermark values of the respective nodes, an evaluation of the packet rate values of the respective nodes, and an evaluation of the burst length values of the respective nodes.

16. A computer-based method for synthesizing a Network-on-Chip (NoC), comprising:
receiving traffic data and a baseline topology, the traffic data including a plurality of traffic flows, each traffic flow including one or more traffic classes, the baseline topology including a plurality of bridge ports, a plurality of routers and a plurality of connections, each router including a number of ports, each router configured to process a plurality of traffic classes and to support a maximum number of virtual channels (VCs);
for each router:
  determining a number of edge virtual channel (EVC) combinations, each EVC combination including a number of available edges and a number of available VCs, each available edge corresponding to a different port,
  determining whether the traffic classes are transmittable or receivable by at least one EVC combination, and
  when the traffic classes are determined not transmittable or receivable, identifying the router;
generating a traffic class affinity graph (TCAG) for each identified router;
generating traffic class combinations for the identified routers based on the TCAGs and the EVC combinations;
merging traffic classes of the identified routers based on the traffic class combinations;
determining a final EVC combination for each identified router based on the merged traffic classes; and
generating a final topology based, at least in part, on the merged traffic classes and the final EVC combinations for the identified routers.

17. The computer-based method according to claim 16, where:
for each router, the number of available edges is equal to or less than the number of ports, and the number of available VCs is equal to or less than the maximum number of VCs; and
the traffic class combinations are generated by k-way minimum cost partitioning for each identified router, where k is the number of EVC combinations for the identified router.

18. The computer-based method according to claim 17, where said generating traffic class combinations includes:

adding one or more routers to the baseline topology, each added router configured to process one or more traffic classes of the identified routers;

determining a number of EVC combinations for each added router;

generating a TCAG for each added router; and identifying each added router.

19. The computer-based method according to claim 16, where the TCAG for each identified router includes:

a plurality of nodes, each node associated with a different traffic class processed by the identified router; and a plurality of edges, each edge connecting a different pair of nodes, each edge having a weight that indicates a degree to which the traffic classes of the respective nodes are combinable, where each edge weight is a traffic-class affinity metric that is determined based on one or more affinity characteristics of the traffic classes of the respective nodes.

20. The computer-based method according to claim 19, where:

the affinity characteristics include at least one of a latency sensitivity (LS), a watermark, a packet rate and a burst length;

each traffic class includes at least one of an LS value, a watermark value, a packet rate value, and a burst length value; and the traffic-class affinity metric includes at least one of a comparison of the LS values of the respective nodes, a comparison of the watermark values of the respective nodes, an evaluation of the packet rate values of the respective nodes, and an evaluation of the burst length values of the respective nodes.

* * * * *